(12) United States Patent
Lankinen et al.

(10) Patent No.: US 7,853,553 B2
(45) Date of Patent: Dec. 14, 2010

(54) ENGINE FOR CONVERTING DATA FROM A SOURCE FORMAT TO A DESTINATION FORMAT USING USER DEFINED MAPPINGS

(75) Inventors: Risto Lankinen, Redwood Shores, CA (US); Robert A. Brodersen, Redwood City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 901 days.

(21) Appl. No.: 10/118,667

(22) Filed: Apr. 8, 2002

(65) Prior Publication Data

US 2007/0220022 A1    Sep. 20, 2007

Related U.S. Application Data

(63) Continuation of application No. 09/818,015, filed on Mar. 26, 2001, now abandoned.

(51) Int. Cl.
*G06F 7/00* (2006.01)
(52) U.S. Cl. ....................................... 707/602
(58) Field of Classification Search ......... 707/100–102, 707/602
See application file for complete search history.

(56) References Cited

U.S. PATENT DOCUMENTS

| 5,278,978 | A | * | 1/1994 | Demers et al. | 707/101 |
| 5,416,917 | A | * | 5/1995 | Adair et al. | 707/203 |
| 5,566,332 | A | * | 10/1996 | Adair et al. | 707/101 |
| 5,694,598 | A | * | 12/1997 | Durand et al. | 707/103 R |
| 6,009,436 | A | * | 12/1999 | Motoyama et al. | 707/102 |
| 6,016,501 | A | * | 1/2000 | Martin et al. | 707/203 |
| 6,035,307 | A | * | 3/2000 | Martin et al. | 707/203 |
| 6,101,500 | A | * | 8/2000 | Lau | 707/103 R |
| 6,151,608 | A | * | 11/2000 | Abrams | 707/204 |
| 6,356,901 | B1 | * | 3/2002 | MacLeod et al. | 707/6 |
| 6,408,302 | B1 | * | 6/2002 | Lee et al. | 707/102 |
| 6,442,663 | B1 | * | 8/2002 | Sun et al. | 711/202 |
| 2002/0059307 | A1 | * | 5/2002 | Tomita et al. | 707/200 |

OTHER PUBLICATIONS

Chang et al. "Conjunctive Constraint Mapping for Data Translation", 1998, ACM Digital Libraries, 0-89791-965, pp. 49-58.*

* cited by examiner

*Primary Examiner*—Wilson Lee
*Assistant Examiner*—Michael Le
(74) *Attorney, Agent, or Firm*—Campbell Stephenson LLP

(57) ABSTRACT

A system and method for transforming a data object from a source form into a destination form is described. In one embodiment, the data object is stored in its source form as a set of related source components forming a source data structure having a first hierarchical configuration. The data object is stored in its destination form as a different set of related destination components forming a destination data structure having a different hierarchical configuration. A user is enabled to define a transformation map including a set of transformation mapping expressions declared by the user for transforming the data object between its source form and its destination form. The data object is then automatically transformed from its source form into its destination form based on the transformation map defined by the user and the source and destination data structures.

38 Claims, 15 Drawing Sheets

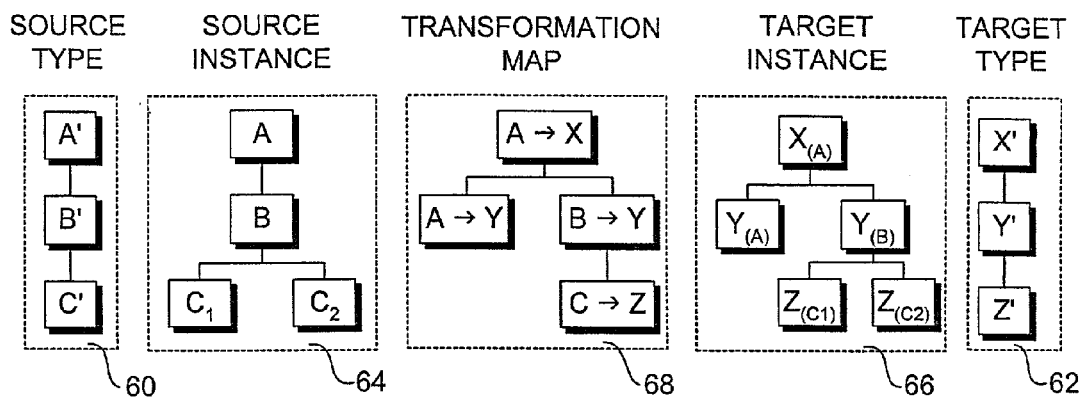
*FIG. 11*
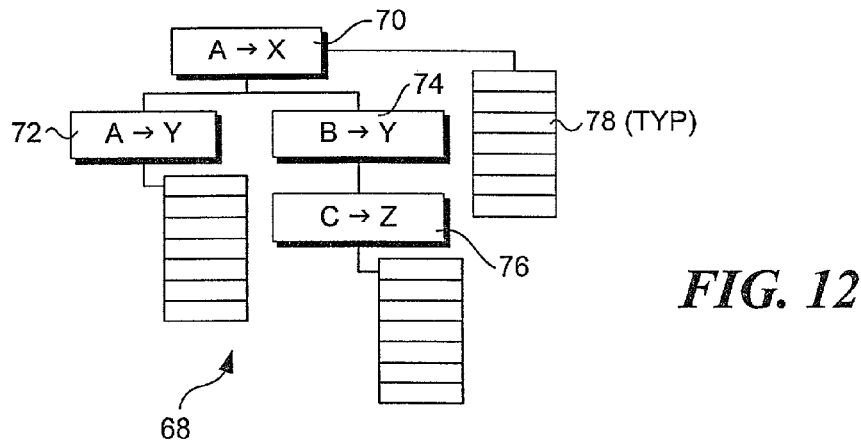
*FIG. 12*
|  | A → X | A → Y | B → Y | C → Z |
|---|---|---|---|---|
| A | ✓ | ✓ |  |  |
| B |  |  | ✓ |  |
| $C_1$ |  |  |  | ✓ |
| $C_2$ |  |  |  | ✓ |
*FIG. 13*

ENGINE FOR CONVERTING DATA FROM A SOURCE FORMAT TO A DESTINATION FORMAT USING USER DEFINED MAPPINGS

The present patent application is a Continuation of prior application Ser. No. 09/818,015, filed Mar. 26, 2001, entitled DECLARATIVE DATA TRANFORMATION ENGINE

BACKGROUND OF THE INVENTION

1. Field of the Invention

The present invention relates to databases in general, and, in more particular, a mechanism for transforming the format data is stored in to allow seamless integration between business applications.

2. Background Information

There are many instances in which corporate enterprises spend a large amount of resources supporting a particular software application or suite of applications. Oftentimes, such software applications are proprietary and do not provide interfaces that enable other applications to access data stored by the applications. Typically, in order to enhance performance (e.g., through faster operation or new features) the corporate enterprise must continue to purchase new versions of the applications and/or purchase productivity tools from the software vendor who produces the application or a third party that provides such tools.

With the emergence of e-business and the exponential growth of information technology, new techniques and methodologies have been developed to enhance the performance of business applications in a wide range of industries, including manufacturing, marketing, and sales. In most instances, the new techniques and methodologies are implemented using new applications that store data in particular formats that are optimized for use with the applications. Generally, these data formats and architectures are defined in a manner that makes it impractical or impossible to share data between applications. This becomes particularly problematic for those enterprises that have been using a certain application for years, such as a manufacturing processing tool, and have a great deal of data that have been generated by the tool and/or inserted into a database supported by the tool: the new improved tool cannot access the existing data in a reliable or useful manner, and years or even decades of information must be re-entered into the new system. In many cases, this process is envisioned to be so burdensome that the corporate enterprise will decide to not switch over to the new application.

SUMMARY OF THE INVENTION

The present invention provides a system and method for transforming a data object from a source form into a destination form. Typically, the source form will correspond to a form in which the data object is stored in a source business application, while the destination form will correspond to a form in which the data object is stored in a destination business application. Optionally, the invention enables data to be transformed between old and new schemas in a database controlled by a single business application. Generally, the data object will be stored in its source form as a set of related source components forming a source data structure having a first hierarchical configuration, while the data object will be stored in its destination form as a different set of related destination components forming a destination data structure having a different hierarchical configuration. The transformation is accomplished by enabling a user to declare a set of transformation mapping expressions that define how the data object is to be transformed from its source data structure into its destination data structure, as well as defining the source and destination data structures. A declarative data transformation engine (DDTE) then transforms the data object from the source data structure into the destination data structure based on the user-defined transformation mapping expressions.

According to one of the invention, the method comprises defining a source data structure corresponding to a form in which the data object is stored in the source business application. The source data structure may comprise a plurality of source components and their relationships, as well as attributes (e.g., fields) for each component. Similarly, a destination or target data structure is defined corresponding to a form in which the data object is to be stored in the destination business application. This destination data structure may comprise a plurality of related components and their attributes as well. A user-interface is provided that allows users to define a data transformation map comprising the data structures of both the source and destination forms of the data object, as well as declaring a set of field expressions that determine how data is to be transformed between source components and destination components. The DDTE then interprets the data transformation map to transform one or more instances of the data object from its source form into its destination form.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 11 is a block schematic diagram for describing an exemplary transformation of a data object from a source form into a destination form;

FIG. 12 is a block schematic diagram illustrating the various components of a transformation map used to transform the data object of FIG. 11;

FIG. 13 is a table identifying the source and destination components the various transformation map functions operate on;

DETAILED DESCRIPTION OF THE ILLUSTRATED EMBODIMENTS

A system and method for transforming data is described in detail herein. In the following description, numerous specific details are provided, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
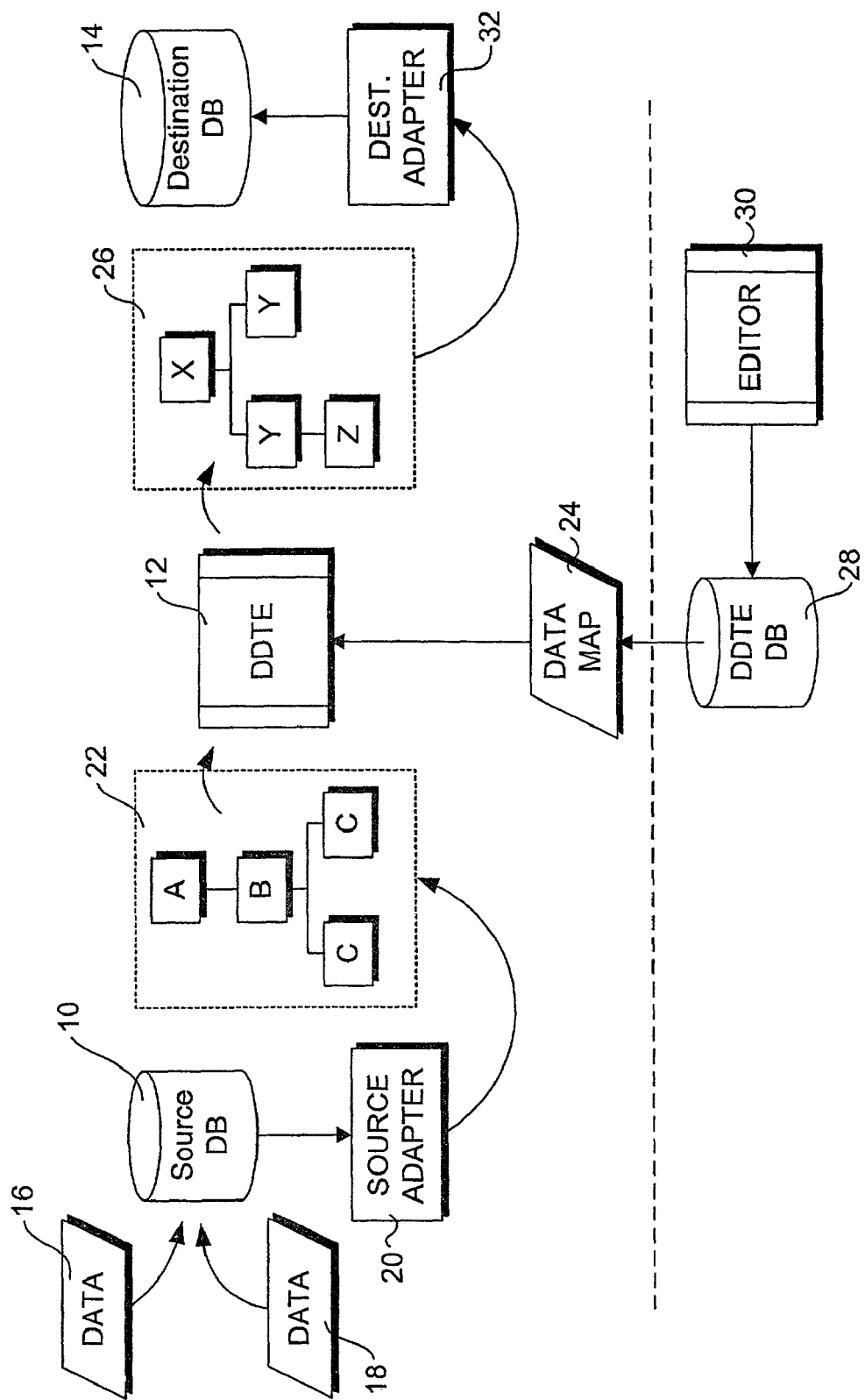
FIG. 1A is a block schematic diagram illustrating a high level view of the primary functional components of one embodiment of the present invention in which data objects are transformed between a source business application and a destination business application.

An overview of one embodiment of the present invention is shown in FIG. 1A. In this embodiment, data stored in a source database 10 is transformed using a declarative data transformation engine (DDTE) 12 into a format and/or structure corresponding to a schema provided by a destination database 14.

Over time, data, represented by data blocks 16 and 18, are entered by various users and stored in source database 10. For example, various sales contact information may be entered by members of an enterprise's sales force and stored in source database 10. In addition, data in source database 10 may be generated by the database itself or application systems that integrate with source database 10. Data in source database 10 may be extracted through use of a source adapter 20. Generally, source adapter 20 will extract a set of data based on a query that identifies which data is to be selected from source database 10 using a standard query language. For example, many enterprise databases typically are stored using a Relational Database Management System (RDBMS) that implements SQL (structured query language) queries to select data from the database. Examples of RDBMS database include Oracle 8i, Microsoft SQL server 7, and databases produced by Informix and Sybase. In other instances, source adapter 20 will comprise a proprietary selection engine.

Upon extraction by source adapter 20, component instances of each instance of the data object in the selected source data set are loaded into a memory buffer in a hierarchical manner, as illustrated by source data object instance memory representation 22, which includes an "A" component instance, which is the parent to a "B" component instance, which is the parent to a pair of "C" component instances. The source data object instance memory representation is input into DDTE 12, which applies a set of operations defined by a data map 24 to produce a destination data object instance memory representation 26. As explained in further detail below, data map 24 comprises a set of transformation mapping expressions defined in a plurality of related tables stored in a DDTE database 28. These mapping expressions are entered by a user or user(s) as a set of declarative statements that define how data objects are to be transformed from an original format in source database 10 to a destination format corresponding to a destination schema corresponding to destination database 14. Depending on the particular implementation, DDTE database 28 may or may not coincide with destination database 14. For example, DDTE database 28 may reside on a local machine running software that provides functions performed by DDTE 12, or may comprise a user schema stored on destination database 14. The transformational mapping expressions may be entered into DDTE database 28 using an editor 30, further details of which are also discussed below.

The mapping expressions are used to convert a data object in a source format into a generally similar, albeit different, destination format. As illustrated in FIG. 1A, destination data object instance memory representation 26 includes an "X" component instance that is a parent of two "Y" component instances, one of which is the parent of a "Z" component instance. Once the data object instances corresponding to the selected data set have been converted into destination data object instance memory representations 26, they are processed by a destination adapter 32 and stored in destination database 14. As before, destination database 14 may comprise an RDBMS database that uses a standard language, such as SQL, or it may comprise a proprietary database.

Figure 1B:
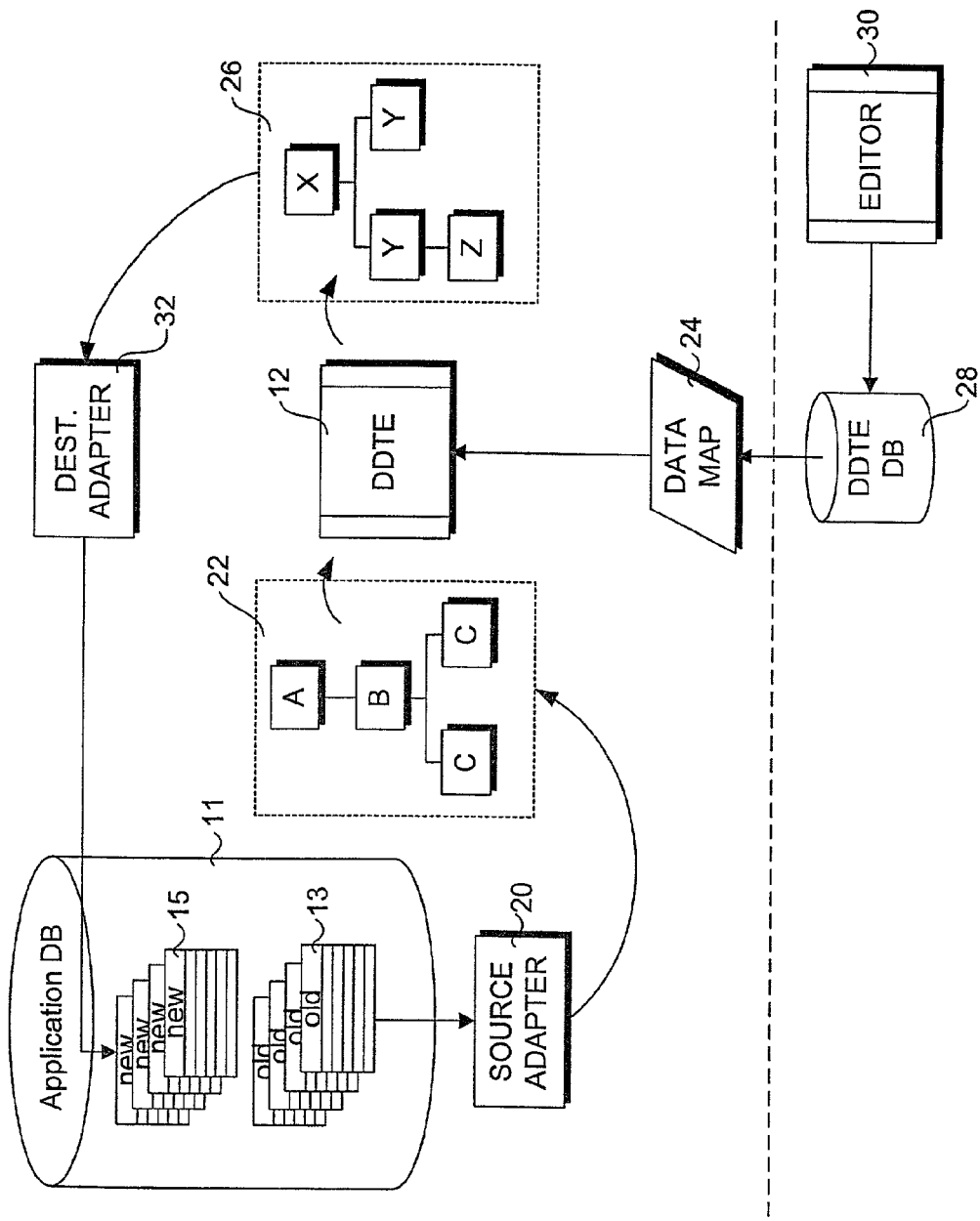
FIG. 1B is a block schematic diagram illustrating a high level view of the primary functional components of one embodiment of the present invention in which data objects are transformed between an old and a new schema used by a single business application.

In addition to being able to transform data objects between source and business applications, the present invention may also be used to transform data objects between old and new schemas running within a database controlled by a single business application. As depicted in FIG. 1B, various data comprising a source form of the data object are extracted from a first set of tables corresponding to an old schema 13 that is running within an application database 11. These data objects are then processed in a manner similar to that discussed above until they reach destination adapter 32, whereupon the transformed data objects are stored in a set of tables corresponding to a new schema 15, wherein the data objects are stored so as to reflect their destination form.

Figure 2:
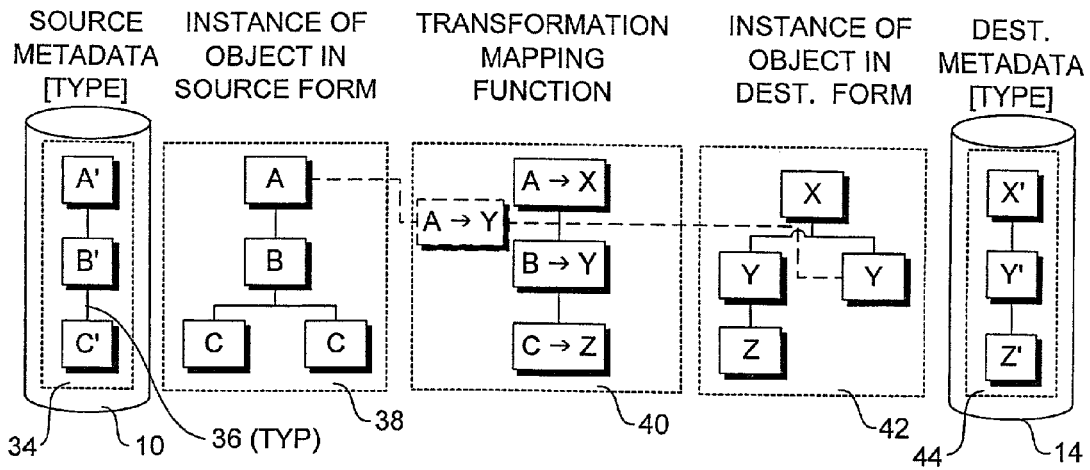
FIG. 2 is a block schematic diagram illustrating one embodiment of the transformation of a data object from a source form corresponding to how the data object is stored in a source business application into a destination object that is stored by a destination business application.

With reference to FIG. 2, various data considered during the transformation process are illustrated, beginning with a source metadata definition 34. Data in an RDBMS is stored in a set of tables, which are generally related. The tables and their relations, as well as other data, comprise a database's "schema." The database schema describes the structure of how data is stored in the database (i.e., logical structure and rules), and includes a list of tables and attributes (i.e., column names or fields) for those tables, as well as definitions for other database objects, such as indexes, views, etc. The schema also includes constraints on the various attributes, including identifying which attribute(s) comprise each table's primary key, whether any foreign keys exist for that table and which attribute(s) comprise such foreign keys, if any. Typically, the database's schema is stored as "metadata" in the database.

Source metadata definition 34 describes how data corresponding to a source data object to be transformed is stored in source database 10. For example, as depicted in the Figure, a portion of the data object (i.e., component "'A'") may be stored in a source table "A'", while other portions (components "B" and "C") of the data object may be stored in a table "B'" that is a child of table A', and in a table "C'", which is a child of table B', wherein each link 36 represents a parent-child relationship between the tables. Parent-child relationships are what make RDBMS databases relational, enabling complex data objects to be stored in a plurality of different tables that contain relational links. Typically, a child table includes one or more columns (called foreign key columns) that contain data that matches data in the primary key column(s) of the parent table.

A particular source data object (or more typically, a set of data objects having a common form) that is desired to be transformed so that it may be stored in destination database 14 is queried using source adapter 20, which produces multiple instances of the data object corresponding to the selected data set. Each instance of the data object will comprise a plurality of component instances, wherein each component instance will typically comprise all or a portion of data stored in a row of a table corresponding to that component of the data object. Generally, when an instance of a data object is retrieved from an RDBMS database, a set of rows of data are returned, wherein each row of data corresponds to an instance of the data object. This data is in a flattened, non-hierarchical format that does not contain any information concerning how the different components of the data are related. However, for transformational purposes it is necessary to include a mechanism for defining how these components are related. Accordingly, source adapter 20 further transforms data corresponding to the flattened format of the data object instance into a hierarchical in-memory representation in which the component relationships are included, to create source data object instance representation 22. For example, as depicted by a source object instance form 38, the source data object includes component instances "A", "B", and "C", wherein component instance "A" comprises all or a portion of a row of data from table A', component instance "B" comprises all or a portion of data from a row in table B' related to the row of data from table A', and component instance "C" comprises all or a portion of two rows of data from a row in table C' related to the row of data from table B'.

As discussed above, a set of transformational mapping functions defined by data map 24 is used to transform data objects from their source format into their destination format. For the current example, these transformational mapping functions are depicted in a transformation mapping function block 40 and include transformation maps A→X, B→Y, and C→Z. An optional transformational map A→Y is shown for illustrative purposes, emphasizing that mappings between components occupying different hierarchical levels may be implemented in addition to mappings between components occupying similar hierarchical levels, and that any and all Source Components and Destination Components may freely and independently appear in any number of Component Maps. Each transformational mapping function takes a source component as an input, and produces a destination component as an output. An exemplary destination component output corresponding to the present example is depicted in FIG. 2 as a destination object instance form 42 that includes an "X" component instance that is a parent to two "Y" component instances, one of which is a parent to a "Z" component instance. The transformational mapping functions and structure of the destination object instance will be based on how the data object is to be stored in destination database 14, as defined by destination metadata 44.

Figure 3:
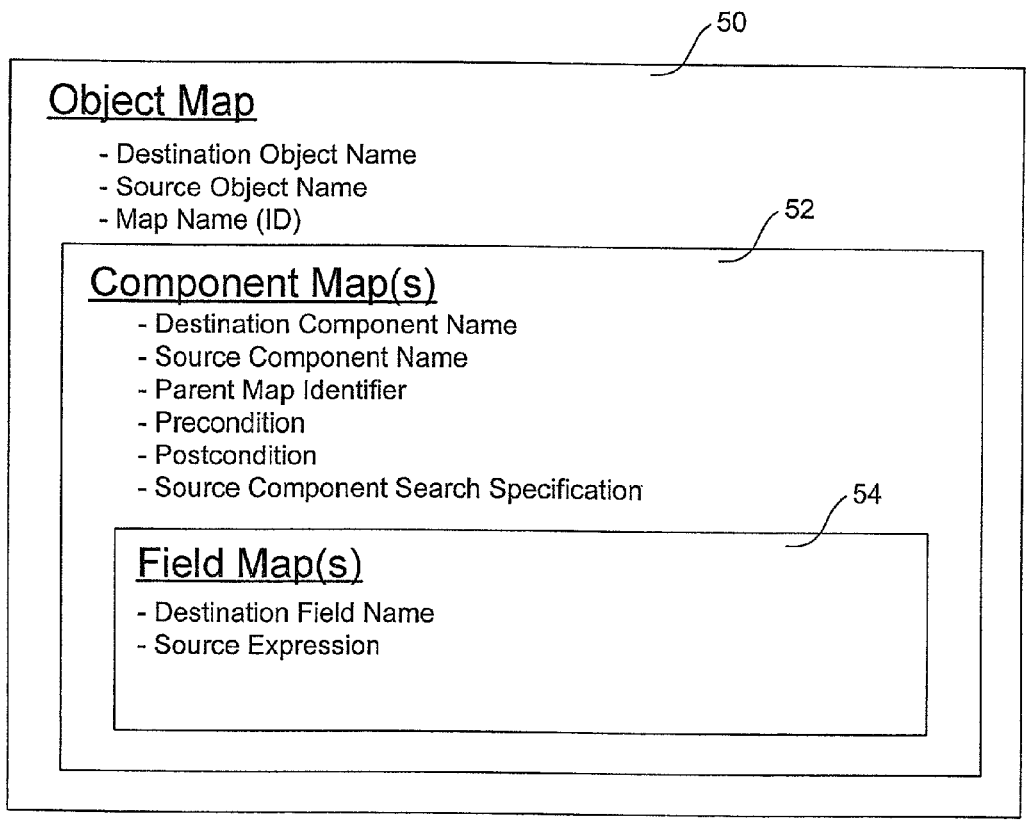
FIG. 3 illustrates the three-level hierarchy for storing transformation mapping information that includes an object map at a top level, one or more component maps at a middle layer, and zero or more field maps for each component map at a bottom layer.

Transformation mapping functions 40 are implemented through a set of related components, divided into three hierarchical levels, as shown in FIG. 3. At the top level of the hierarchy is an object map 50, which includes several attributes, including a map name, destination object name, and source object name. Object map 50 includes zero or more component maps 52, which occupy the second level of the hierarchy and includes source and destination component names, as well as an optional parent map identifier, an optional precondition, an optional postcondition, and an optional source component search specification. At the third level of the hierarchy are zero or more field maps 54, each of which includes a destination field name and a source expression. In addition to the attributes discussed above, each of object map 50, component maps 52, and field maps 54, include additional attributes that are discussed below.

Figure 4:
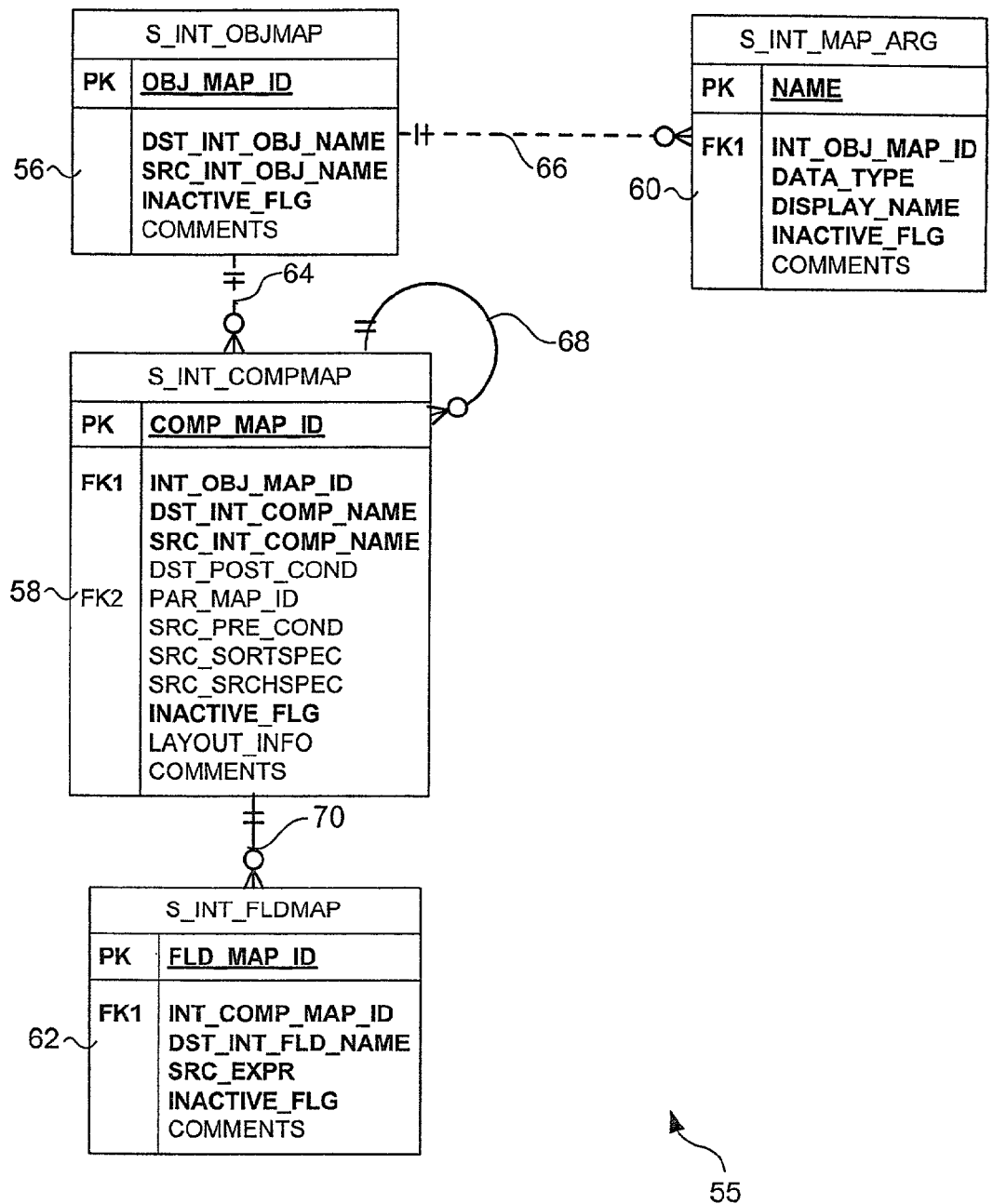
FIG. 4 is a data model diagram illustrating various columns and relationships between a set of four tables that are used by embodiments of the present application to store transformational mapping information.

Physically, the transformation map is stored in four database tables, one respective table for each level, and a fourth table for map arguments. An exemplary data model diagram 55 for implementing the transformation map is shown in FIG. 4, which includes an Object Map table 56 that is the parent table to a Component Map table 58 and a Map Argument table 60. In addition, Component Map table 58 is a parent table to a Field Map table 62.

In the diagram, primary key columns are identified by "PK", while foreign key columns are identified by "FK1" and "FK2." Mandatory columns are bolded, while non-bolded columns are not required to store values (i.e., may be null). As discussed above, tables 56, 58, 60, and 62 are linked by common values in primary key columns of parent tables and foreign key columns of child tables. Accordingly, the primary key column of Object Map table 56, "OBJ_MAP _JD," is used to form a parent-child linking relationship between Object Map table 56 and each of Component Map table 58 and Map Argument table 60 via a foreign key column "INT_OBJ_MAP_ID" in each of these child tables, as depicted by relationships 64 and 66. In addition, a recursive relationship 68 operating on Component Map table 58 is formed using foreign key "PAR_MAP_ID" and primary key "COMP_MAP_ID." Furthermore, the primary key column of Component Map table 58, "COMP_MAP_ID", is used to form a parent-child linking relationship 70 with Field Map table 62 via the "INT_COMP_MAP_ID" foreign key column.

The Object Map is stored in an Object Map table 56 named "S_INT_OBJMAP" in diagram 55, which includes the following columns:

| Name | Description |
|---|---|
| OBJ_MAP_ID | Map Name |
| DST_INT_OBJ_NAME | Destination Object Name |
| SRC_INT_OBJ_NAME | Source Object Name |
| INACTIVE_FLG | Boolean Flag Marking Whether Inactive |
| COMMENTS | User Comments |

The Object Map defines a name for the map, as well as the names of the source (input) and destination (output) objects. The types of the input and output objects are determined based on source metadata 34 and destination metadata 44. The Map Name is a unique identifier (i.e., primary key) for the Object Map. At run-time, the actual type of the Input Integration Object instance must match with the type specified in the Source Object Name field, or otherwise an error will be issued. Also, executing the Object Map will generate zero or more Output Integration Object instances having an object type corresponding to the object type of the destination object.

The Component Map is stored in a Component Map table 58 named "S_INT_COMPMAP" in diagram 55, which includes the following columns:

| Name | Description |
|---|---|
| COMP_MAP_ID | Component Map Name |
| INT_OBJ_MAP_ID | Containing Object Map Id |
| DST_INT_COMP_NAME | Destination Component Name |
| DST_POST_COND | Post Condition for Destination Component |
| PAR_MAP_ID | Parent Map Name |
| SRC_INT_COMP_NAME | Source Component Name |
| SRC_PRE_CONDITION | Preliminary Condition for Source Component |
| SRC_SORTSPEC | Source Sort Specification |
| SRC_SRCHSPEC | Source Search Specification |
| INACTIVE_FLG | Boolean Flag Marking Whether Inactive |
| LAYOUT_INFO | Graphical Layout Information |
| COMMENTS | User Comments |

The Component Map controls the instantiation of Integration Components within the current Output Integration Object. Every Integration Component in the Input Integration Object is used to create as many Output Integration Components as there are matching Component Maps in the Input Integration Object. An Integration Component is said to match if its name is the same as the Source Component Name, and if it yields a TRUE value when the Source Search Specification expression is applied to that component.

The root component also controls the instantiation of the Output Integration Objects: When there is a Component Map whose Destination Component Name is the root component of the Output Integration Object, then a new instance of the Output Integration Object will be created for every matching Input Integration Component, and all of its child Component Maps will be applied to that object, unless any one of them in turn invokes the creation of a new object, which would thereafter be the object that its child Component Maps will populate.

The Component Maps are executed one at a time. When a Component Map is being executed, the input component instance that most recently matched the Source Component Name and Source Search Specification is said to be the current input component.

The order in which the component maps are executed is important for two reasons: First, for any component that is being instantiated there must already exist an instance of its parent component; therefore all parents must be instantiated before any of their children. Second, if more than one instance of a parent component already exists, then there must be a way to specify which parent component instance is to be the parent of a new child component, and one way to control this is to specify that the most recently created parent component will become the parent of all subsequently created children, until another instance of the parent component is created (which therefore becomes the new default parent). However, having a value in the PAR_MAP_ID field overrides this feature by forcing the specified parent output object to become the actual parent.

The Field Map is stored in a Field Map table 62 named "S_INT_FLDMAP" in diagram 55, which includes the following columns:

| Name | Description |
|---|---|
| FLD_MAP_ID | Field Map ID |
| INT_COMP_MAP_ID | Containing Component Map Id |
| DST_INT_FLD_NAME | Destination Field Name |
| SRC_EXPR | Source Expression |
| INACTIVE_FLG | Boolean Flag Marking Whether Inactive |
| COMMENTS | User Comments |

The Field Map does the actual work in the transformation process by assigning values to the destination fields. The value is calculated by evaluating the Source Expression, further details of which are described below.

The set of legal Map Arguments (e.g. the envelope parameters) are stored in Mapping table 60 named "S_INT_MAP_ARG" in diagram 55, which includes the following columns:

| Name | Description |
|---|---|
| NAME | Map Argument Name |
| INT_OBJ_MAP_ID | Containing Object Map Id |
| DATA_TYPE | Data Type |
| DISPLAY_NAME | Display Name |
| COMMENTS | User comments |

Only those argument names that are listed in the Map Arguments table are recognized as envelope parameters for the specified transformation map. The caller can pass any arguments to service calls; however, only those arguments whose type is known to the parser—namely those that exist in the Map Argument Table—will be recognized and hence be useable in expressions.

Figure 5:
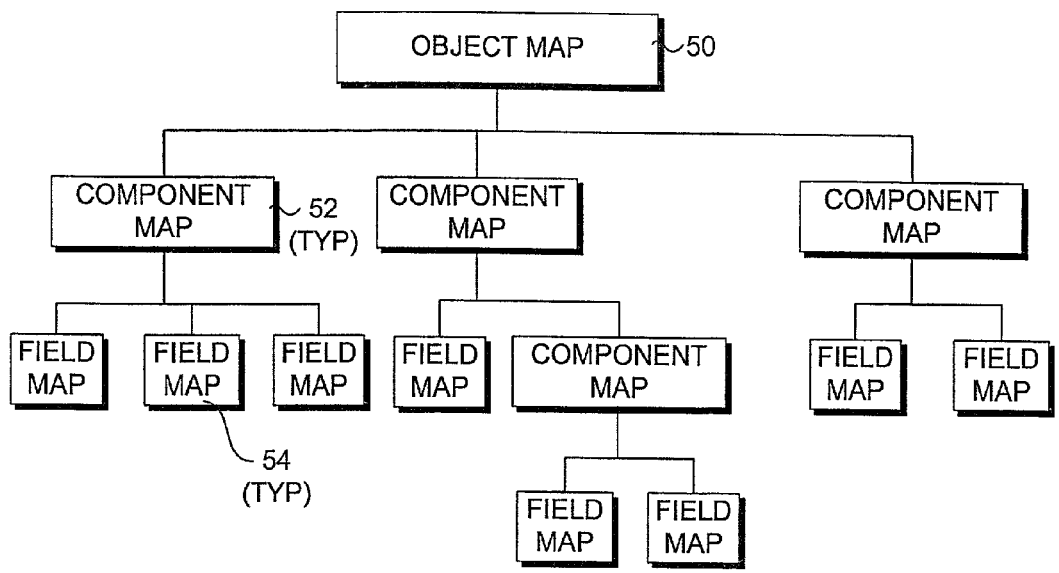
FIG. 5 illustrates the hierarchical structure of a typical transformation map.
Figure 6:
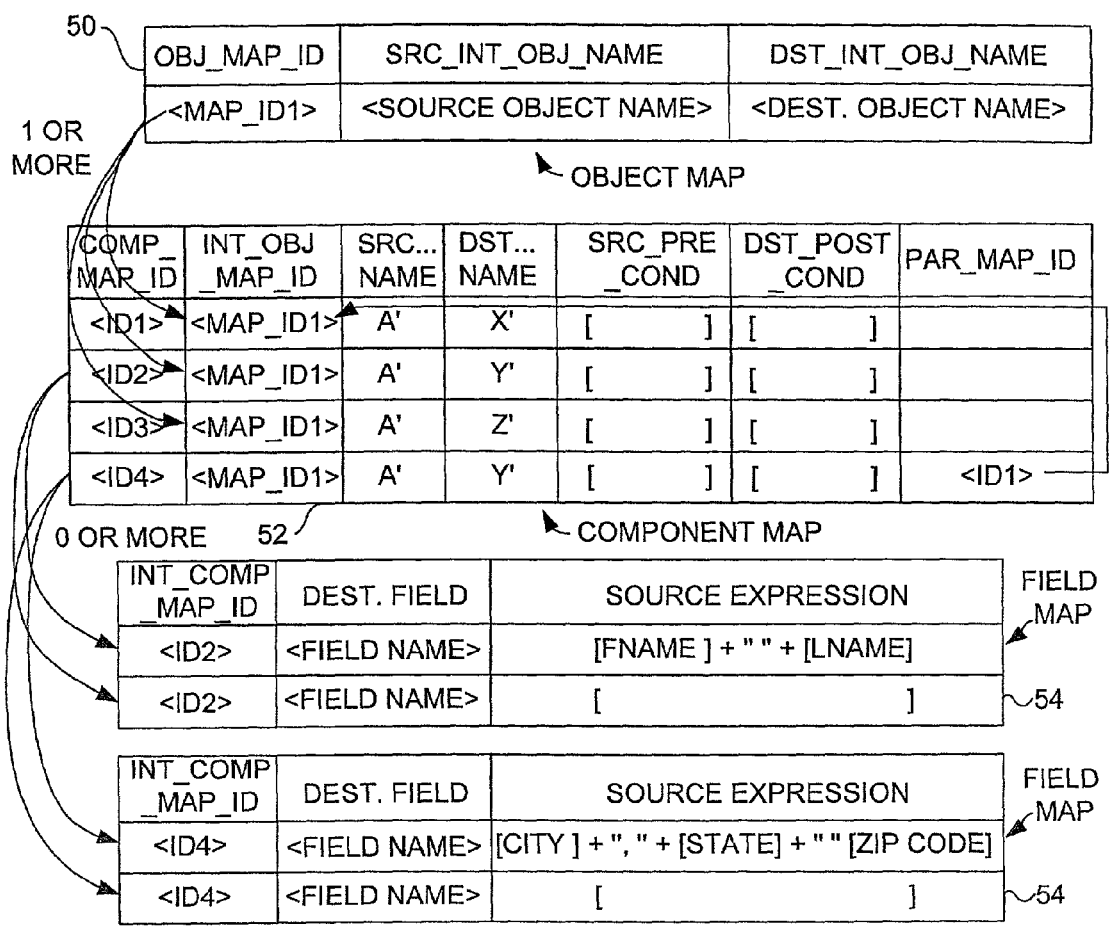
FIG. 6 illustrates an exemplary set of records corresponding to a transformation map definition, which are stored in an object map table, a component map table, and a field map table.

As depicted in FIG. 5, at run-time (i.e., when a transformation map is loaded into memory), DDTE 12 loads into memory data corresponding to the source object such that it forms a tree structure, wherein a source object's object map 50 contains one or more component maps 52, which in turn can contain zero or more component maps 52 and/or field maps 54. In the tree structure, the object map represents the root of the tree, the component maps represent branches, and the field maps represent leaf nodes. A set of table rows corresponding to an exemplary integration object is shown in FIG. 6.

DDTE 12 performs several mapping transformations based on various types of expressions, including source field expressions, source component search specifications, source component sort specifications, preconditions, and postconditions. In one embodiment, the expressions are written using the Siebel Query Language.

All expressions, except postconditions, are associated with an Input Integration Component instance. An expression can address any field of the associated Input Integration Component, or its parent components, simply by specifying the name of the field. However, if the current component has a field with the same name as a parent component, then the parent component field needs to be addressed using dot ('.') notation as shown below:

[ParentComponentName.FieldName]

Note that the dot notation does not have to be applied recursively: The dot notation consists of exactly one component name followed by a dot ('.') regardless of the number of intermediate components that may separate the child (i.e., the child may be a grandchild, great grandchild, etc.) from the parent component. Also note that in practice, the use of dot notation will generally be rare. If a field name in the parent component is unique within that branch of the component tree, then the field name by itself will be sufficient to identify the field. Dot notation will only be necessary when parent and child tables include a field with a common name sharing the same name, and it is desired to address the field in the parent table.

A source expression can also access the Map Arguments (e.g., the optional extra parameters that may be passed to the DDTE business service invocation together with the mandatory Input Integration Object and Map Name parameters) by prefixing the name of the envelope parameter with an ampersand ('&') as shown below:

[&EnvelopeParameterName]

There are a couple of features that are not supported by the Siebel Query Language, namely sorting and grouping result sets. Accordingly, this functionality is implemented by DDTE 14 using separate code specifically written to support sorting and grouping result steps.

In general, postconditions are similar to the other expression types, except that they can only be applied to an Output Integration Component instance, and they cannot access the Map Arguments.

A Source Field Expression is an expression that is used to calculate a value to be assigned to a Destination Field. The type of the expression may be any type that can be assigned to the Destination Field type either directly, or after applying automatic conversions to the result of the expression. Source Field Expressions are a mandatory field of the Field Map table 62, along with the Destination Field Name.

A Source Expression is associated with the Input Integration Component named in the Component Map, which is the parent of the Field Map that contains the Source Expression. Again, dot notation may be used to address fields in the parent components of the containing Input Integration Component, if necessary.

An example of a Source Field Expression is as follows:

[First Name] + " " + [Last Name]

This expression concatenates the fields First Name and Last Name, separating them with a space. A field map would typically use an expression like this to specify a value for a destination field called, e.g., Full Name.

A Source Component Search Specification is a Boolean expression that is used to determine if a given component instance satisfies a given criteria. It may only appear in an Object Map or a Component Map together with an Integration Component Name. Defining a Search Specification is optional, and if it is not defined, the default return value is '1' (denoting Boolean 'TRUE'). The Source Component Search Specification is contained in the SRC_SRCHSPEC field of Component Map table 64.

At run-time the Search Specification is associated with the current instance of the Integration Component type with which it appears in the Object Map or Component Map. The scope (i.e., the extent of the name space within which the identifiers are resolved that appear in the expression) is the named integration component, and all of its parent components in the context of the Input Integration Object of the currently executing Object Map. If a field in the current Integration Component has the same name as a field in a parent component, then the parent component field can be addressed only by using the dot ('.') notation discussed above.

An example of a Source Component Search Specification is shown below:

[Role] = "Billing"

This expression yields a Boolean 'True' value only when the Current Input Integration Component has the value "Billing" in the field "Role." For example, this expression could be used to map an Address source component to a Billing Address destination component. In a typical case, there would also be another Component Map with a similar (or exactly opposite) Search Specification that maps the rest of the Address source components to some other types, such as Shipping Address destination components, ensuring that all Address components get transformed into some destination component type. If no Search Specification is provided, then all Input Integration Components whose type matches the Input Component of the Component Map will be processed.

Every Object Map and Component Map can have an optional Sort Specification, as defined in the SRC_SORTSPEC field of Component Map table 58. This function, when present, shall return a value that will be used as sorting criteria for the components that match the Search Specification. The Input Integration Components will be processed in the increasing order of the value of their Sort Specifications. Components whose Sort Specification yields equal values are processed in the order that they are originally encountered in the Input Integration Object.

The following is an example of a Sort Specification:

[Priority]

When this sort specification is used, the Input Integration Component with the lowest value for Priority will be processed first. Note that taking the negative of the Sort Specification (i.e., using "-[Priority]" instead) will reverse the processing order in systems where a higher priority value denotes desired precedence. If the Sort Specification is omitted from the Component Map, then the Input Integration Components are processed in the order that they are encountered in the Input Integration Object.

Preconditions are evaluated immediately before their containing component map is executed. Preconditions are defined in the "SRC_PRE_COND" field of Component Map table 58. If the result of the precondition, when applied to the current input object, yields Boolean 'True', then the precondition is said to succeed, otherwise the whole transformation is aborted and DDTE engine 12 returns an error to the calling program.

An example of a precondition is as follows:

[Role]="Billing" Or [Role]="Shipping"

This precondition makes sure that the field "Role" of the input object either has a value of "Billing" or a value "Shipping" at run-time. If an input object has any other value in the [Role] field, including a null value, an error will be returned to the calling program. The map developer does not have to perform the same error check again in any field map, which can simplify a potentially large number of field expressions that depend on the same constraint. Preconditions also help keep transformation maps clearer and easier to comprehend by separating error handling from the business logic.

The precondition will be applied only to such input components that are selected by the source search specification. Hence, any input component that fails to match the source search specification does not need to satisfy the precondition either. This is important because input components sometimes have "pivots", e.g., fields whose run-time value determines which other fields must be present and/or bound by some constraint. Since the source search specification and precondition checking are performed separately, the preconditions can be made as strict as appropriate for any given search specification.

A precondition expression may address any field in the current input component, and any of its parent components. It can also address any service call parameter that has been declared as a map argument. In short, the scoping rules for a precondition are the same as for the source search specification of the same component map. If precondition is omitted from a component map, then its default value is '1' (denoting Boolean 'True') and no constraints will be enforced at run-time.

Postconditions are evaluated immediately after the containing component map has been executed. Postconditions are defined in the "DST_POST_COND" field of Component Map table 58. If the result of the postcondition, when applied to the newly created output object, yields Boolean 'True', then the postcondition is said to succeed, otherwise the whole transformation is aborted and DDTE 12 returns an error to the calling program.

The following is an example of a postcondition:
[Object ID]< >" " Or ([First Name]< >" " And [Last Name]<>" ")

This postcondition makes sure that the output component either has a value in the field "Object ID", or in both of the fields "First Name" and "Last Name." A reason for this could be, for example, to make sure that the resulting output component matches some user key.

Because there is no search specification for output components, a different rule for the postcondition invocation is used instead: It will be applied exactly once for every output component that is instantiated as a result of executing its containing component map. Note that if a component map defines both a precondition and a postcondition, then both will be evaluated equally many times—as long as all of them succeed and no other error prevents the transformation from being completed.

The scoping rules are different for postconditions than for any other expression type used by DDTE 12. There are two reasons for this: first, because a postcondition is the only kind of expression that needs to address fields of an output component, and second, because the purpose of a postcondition is to establish a measure for the output object's correctness independently of the input or the execution environment. For these reasons, the only identifiers that are allowed in postcondition expressions are the field names of the newly created output component. If the postcondition is omitted from a component map, its default value is '1' (denoting Boolean 'True'), and no constraints will be enforced at run-time.

Figure 7:
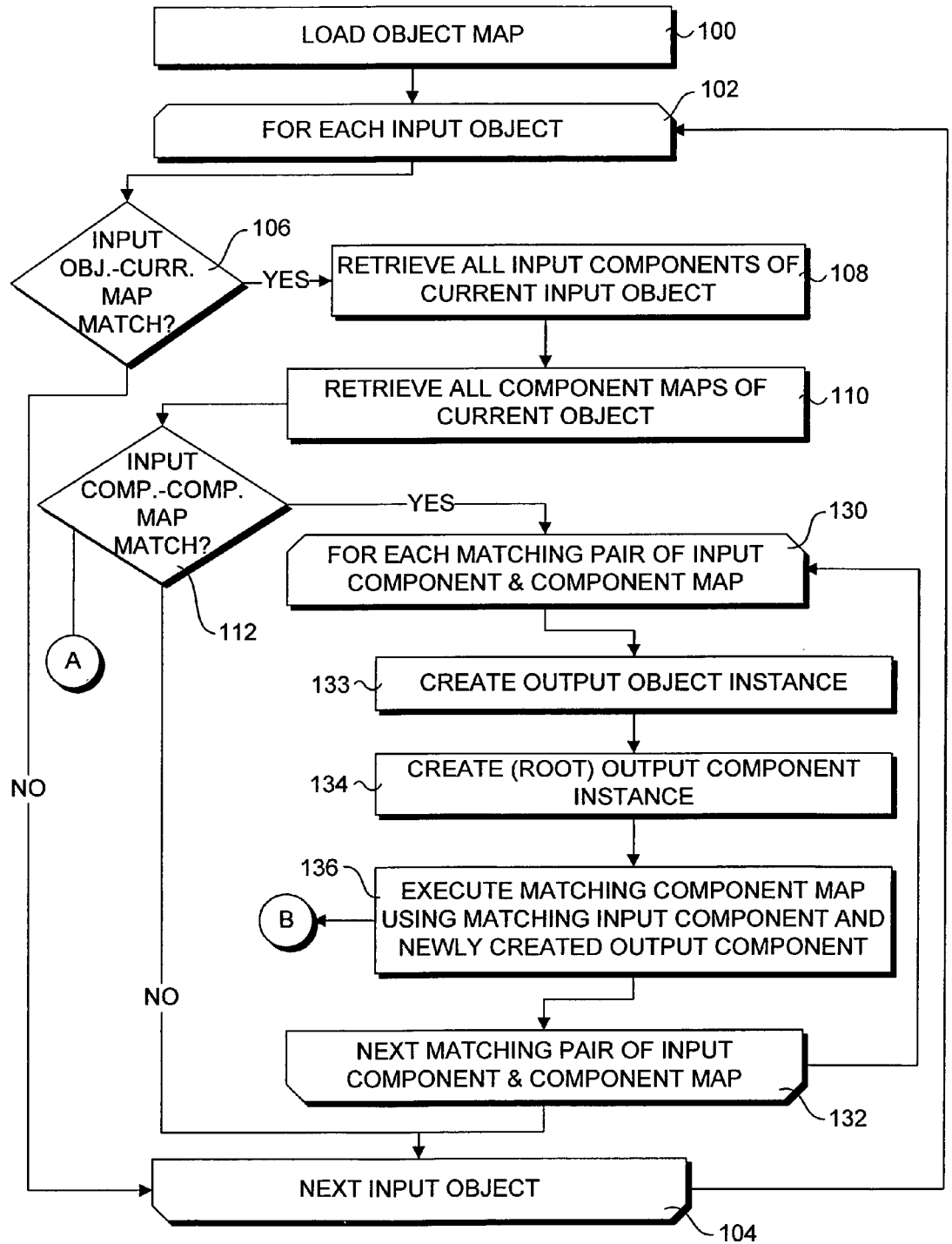
FIGS. 7-10 collectively comprise a flowchart for illustrating the logic used by embodiments of the present invention when transforming a data object from a source form into a destination form.

Flowcharts illustrating the logic used by DDTE 12 when transforming an object are shown in FIGS. 7-10. With reference to FIG. 7, the transformation process begins in a block 100 in which the object map is loaded into memory. Only such map components (i.e. Object Map, Component Map, Field Map, and Map Argument) that are active are loaded into memory. A map component is said to be active if the value in its INACTIVE_FLG field has the Boolean 'False' value. Child components of an inactive map are not loaded either, regardless of whether each one itself is declared active or not. As discussed above, DDTE 12 will typically operate on a set of input objects, rather than a single input object. However, only a single object map is needed for transforming one or many input objects, and only one instance of an input object is transformed at a time. Optionally, a multiprocessor environment could be created to process multiple objects simultaneously. Accordingly, the following functions are performed on each input object, as indicated by start and end loop blocks 102 and 104.

Figure 8:
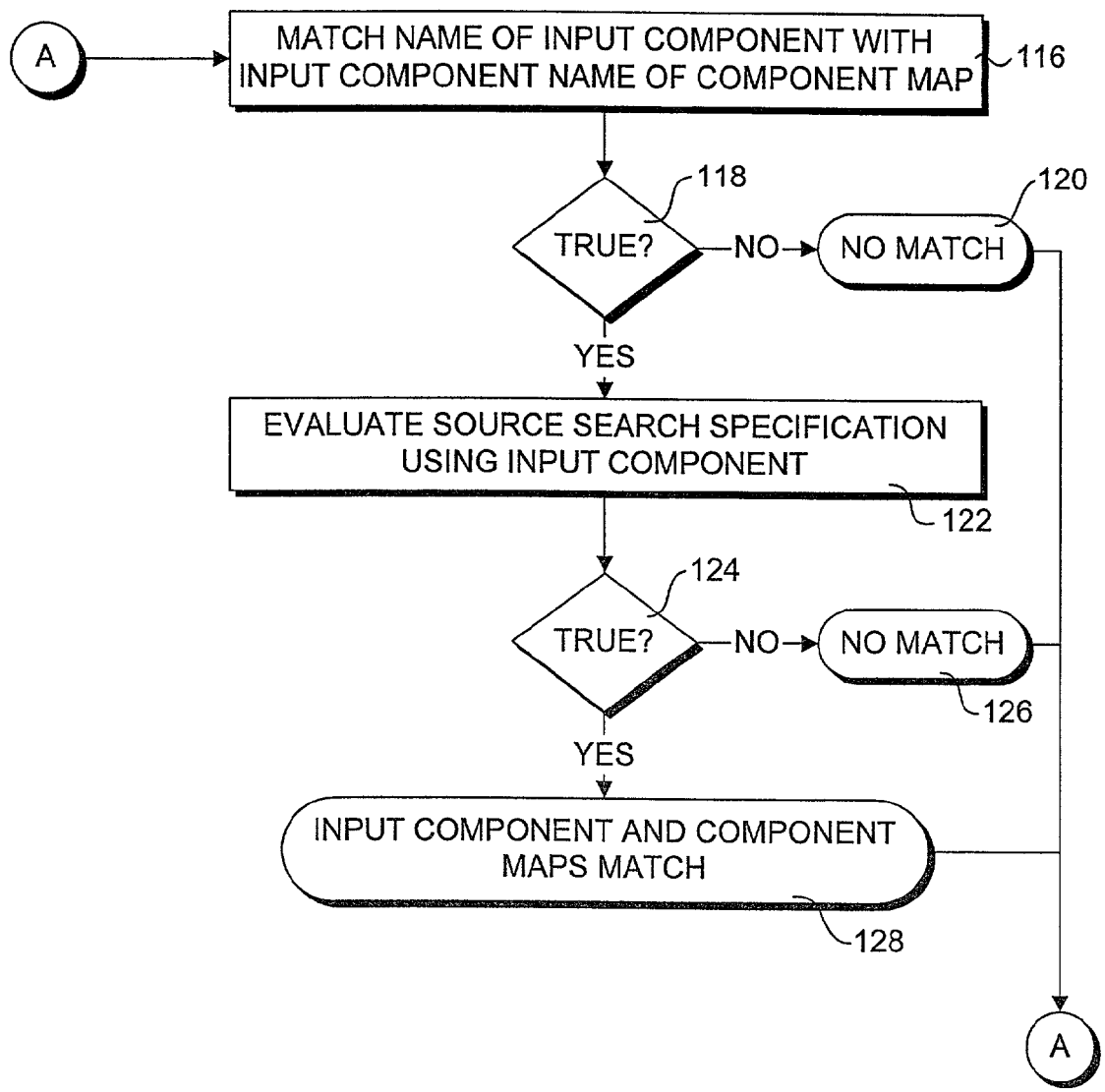
Figure 9:
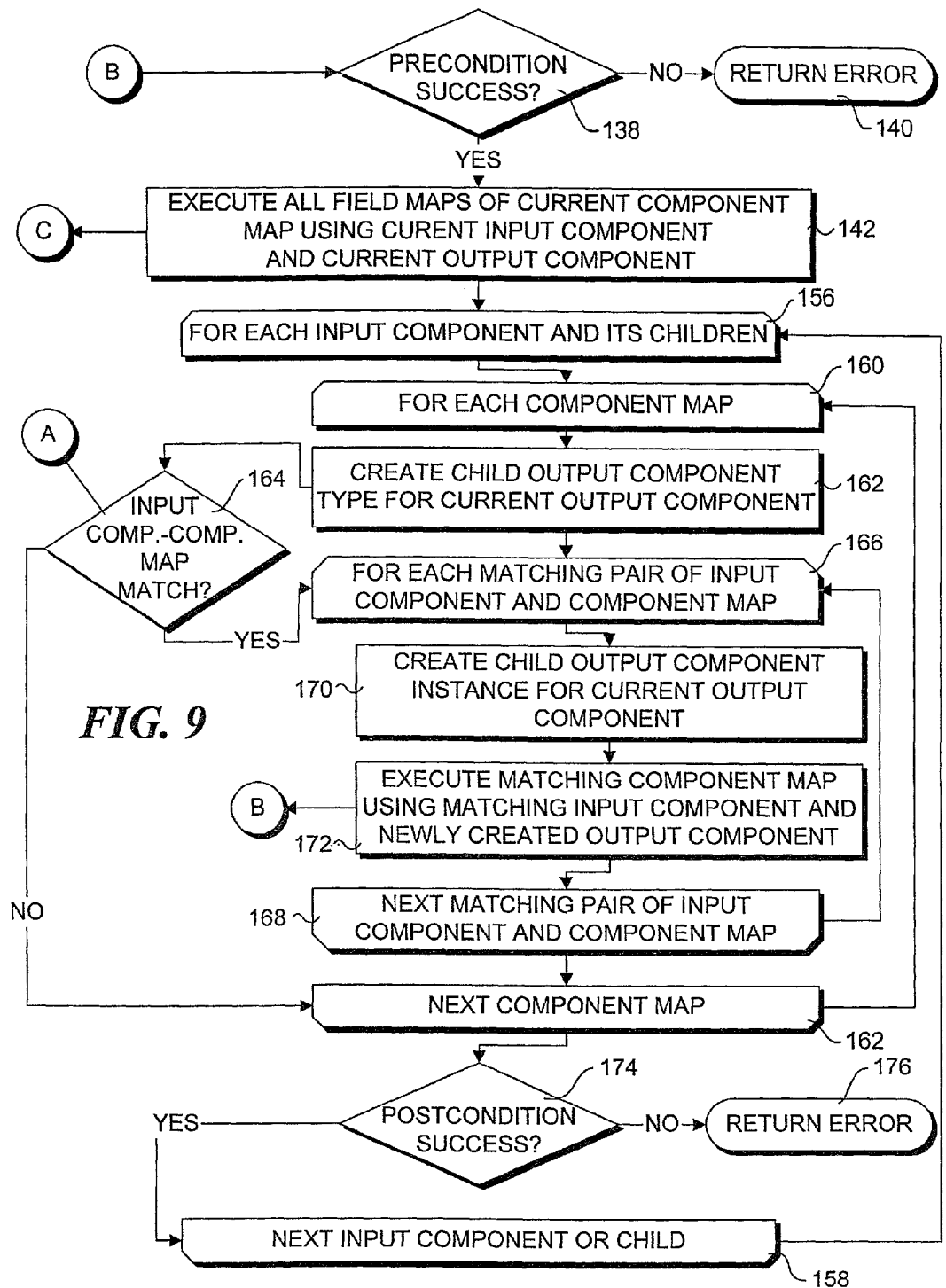

In a decision block 106, a determination is made to whether a current input object matches the input object name of the current object map. If the answer is no, the logic proceeds to process the next input object. If there is a match, the logic proceeds to begin execution of the current object map using the current input object. Transformation operations on the current object begin in blocks 108 and 110, in which all input components and component maps of the current input object are retrieved. Next, a determination is made to whether input component and component maps match in a decision block 112. Details of this function are shown in FIG. 8, wherein a determination of whether the name of the input component matches the input component name of the component map, as provided by a block 116 and a decision block 118. If no match is found, the answer to decision block 118 is no, and a Boolean '0' (i.e., False) is returned in a block 120 to the caller. If there is a match, the answer to decision block 118 is yes, and the logic proceeds to a block 122 in which the source search specification is evaluated using the input component. As provided by a decision block 124, for non-matches a Boolean '0' is returned in a block 126, while for matches, a Boolean value of '1' (True) is returned in a block 128.

Returning to FIG. 7, for each matching pair of input component and component map the following functions are performed, as indicated by start and end loop blocks 130 and 132. If a component map has a sort specification, then it is applied to every matching input component, and the input components for that component map are processed in the order determined by the value of the sort specification, starting from the smallest. In a block 133, an instance of the output object is created, while in a block 134 an instance of the root output component is created. Next, the matching component mapping functions are executed in a block 136 using the matching input component and the newly created output component, wherein details of the various functions performed during this execution process are provided in FIG. 9.

Figure 10:
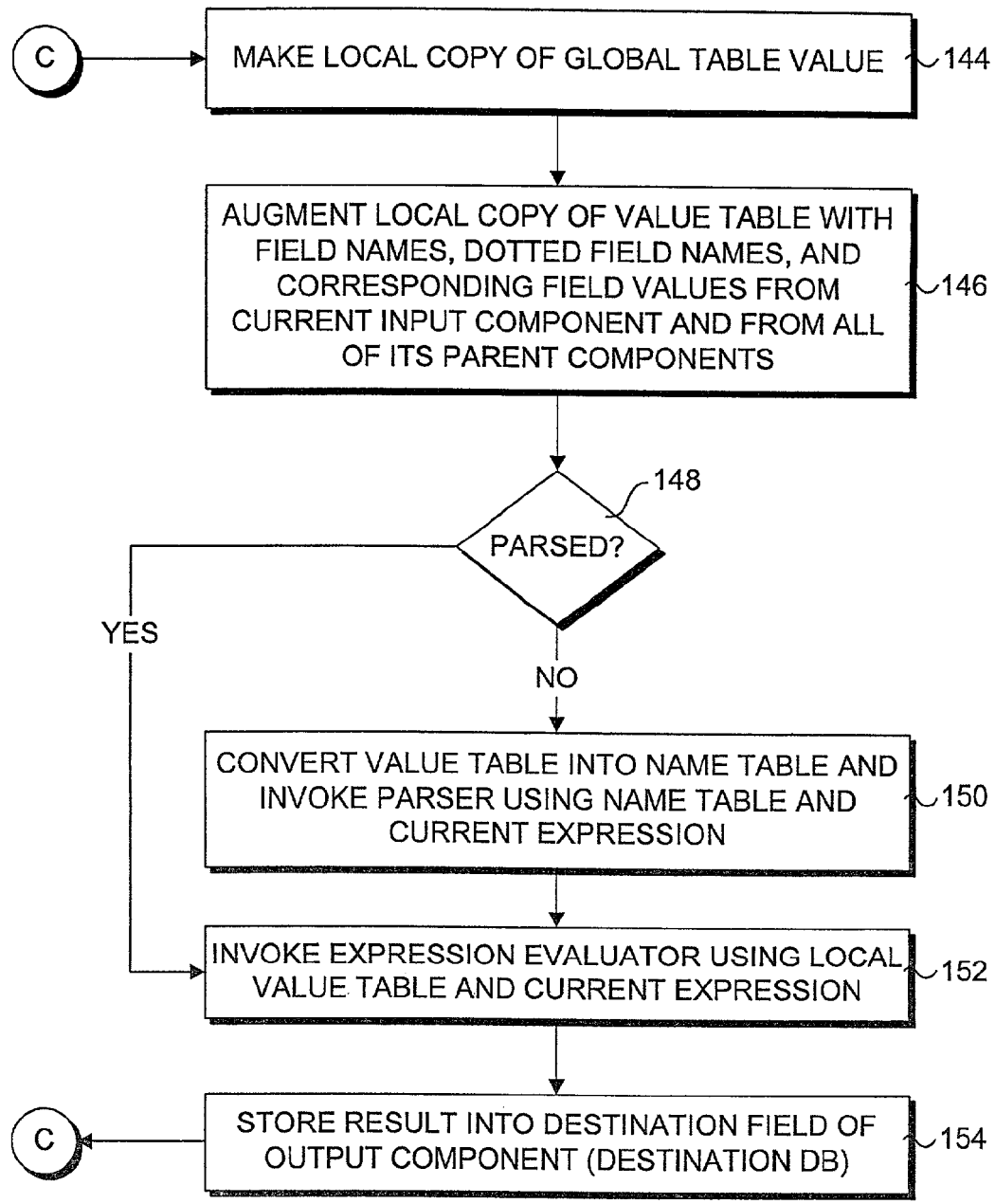

The execution process begins in a block 138, in which a determination is made to whether the precondition expression is successful (i.e., returns 'True'). If it is not successful, an error is returned in a block 140, otherwise the logic proceeds to a block 142, in which all field maps of the current component map are executed using the current input component and the current output component. Details of this process are shown in FIG. 10.

The process begins in a block 144, in which a local copy of the global table value is made. The local copy is then augmented in a block 146 to include field names, dotted filed names, and corresponding field values from the current input component and from all of its parent components. A determination is then made in a decision block 148 to whether the current expression has been parsed. If it has not been parsed, the value table is converted into a name table and the parser is invoked using the name table and the current expression, as provided by a block 150. The expression evaluator is then invoked using the value table and current expression in a block 152. The process is completed in a block 154, in which the expression results are stored into the destination field of the output component.

Returning to FIG. 9, the logic next flows a pair of nested loops, as indicated by outer start and end loop blocks 156 and 158, and inner start and end loop blocks 160 and 162. In accord with the outer loop, for each input component and its children the following is performed. In a block 162, a child output component type is created for the current output component. The logic then proceeds to a determination block 164, in which a determination is made to identify input component and component map matches, similar to decision block 112 discussed above with respect to FIG. 8. As provided by start and end loop blocks 166 and 168, for each matching pair of input component and component map a child output component instance for the current output component is created in a block 170. Again, if the current component map has a sort specification, it is applied to all matching input components to determine the order in which they shall be processed. The matching component map is then executed using the matching input component and new created output component in a block 172, thereby enacting a recursive process with respect to the portion of the flowchart shown in FIG. 9.

The current process continues in a recursive manner until all of the processing of the current input component is completed. The logic then proceeds to a decision block 174 in which a determination is made to whether the postcondition functions are successful, proceeding to process the next input component or child if they are successful, while returning 'False' in a block 176 if they are not successful. The foregoing process is continued until all of the input components and their children have been processed.

As discussed above, processing begins with root components and continues in a recursive manner, as necessary, until all transformation map functions have been executed on appropriate components of the object being transformed. For example, suppose an object comprises a source type 60 and a destination type 62, wherein a source instance 64 has a source format and a destination instance 66 has a destination format, as shown in FIG. 11. The Source instance includes a parent component instance "A", a child component instance "B", and two grandchildren component instances "$C_1$" and "$C_2$." Destination instance 66 includes a parent component instance "$X_{(a)}$", two children component instances "$Y_{(A)}$" and "$Y_{(B)}$", and two grandchildren components instances "$Z_{(C1)}$" and "$Z_{(C2)}$."

An object is converted from its source format into destination format through a set of transformation mapping functions comprising a transformation map 68, further details of which are shown in FIG. 12. Transformation map 68 includes an A→X mapping function 70, an A→Y mapping function 72, a B→Y mapping function 74, and a C→Z mapping function 76. Each of mapping functions 72 and 76 include one or more source expressions 78.

As shown in FIG. 13, transformation processing of the object proceeds from the top of the hierarchy toward the bottom as follows. First, the top level of the source instance of the object is processed. This comprises transforming portions of source object component "A" into a two destination object component: "$X_{(a)}$" and "$Y_{(A)}$" using mapping functions A→X and A→Y. After this source root node has been processed, the process proceeds to the next level in the hierarchy of source format 64, which is occupied by source object component "B." In this instance, source object component "B" is mapped into target object component "$Y_{(B)}$" using mapping function B→Y. Finally, components occupying the third and bottom level of the hierarchy of source format 64 are processed, wherein components "$C_1$" and "$C_2$" are mapped into components "$Z_{(C1)}$" and "$Z_{(C2)}$" using mapping function C→Z.

Figure 14:
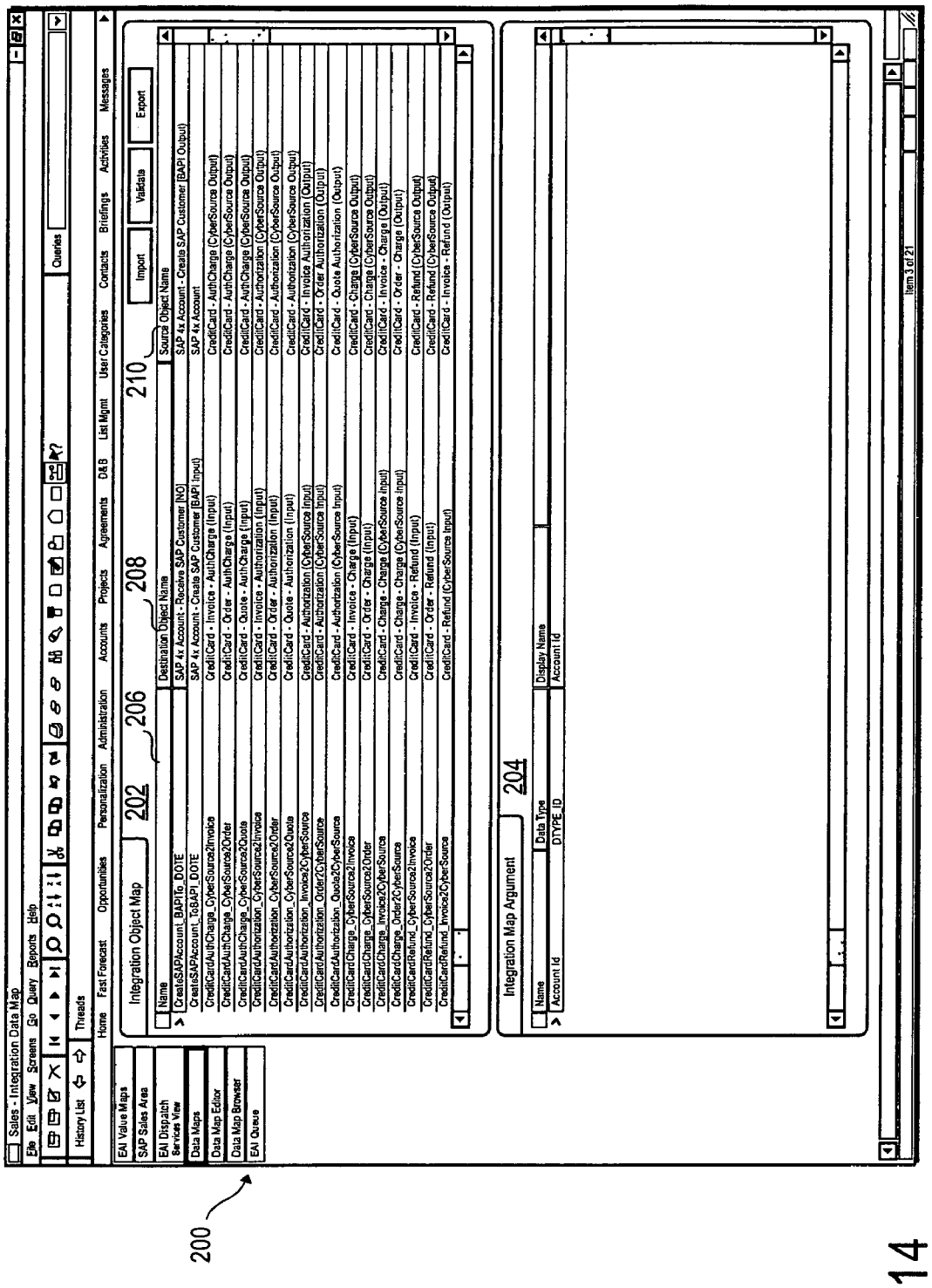
FIG. 14 is a representation of an exemplary user-interface provided by an application program corresponding to embodiments of the present invention, wherein the user-interface enables a user to define an object map and corresponding map arguments.
Figure 15:
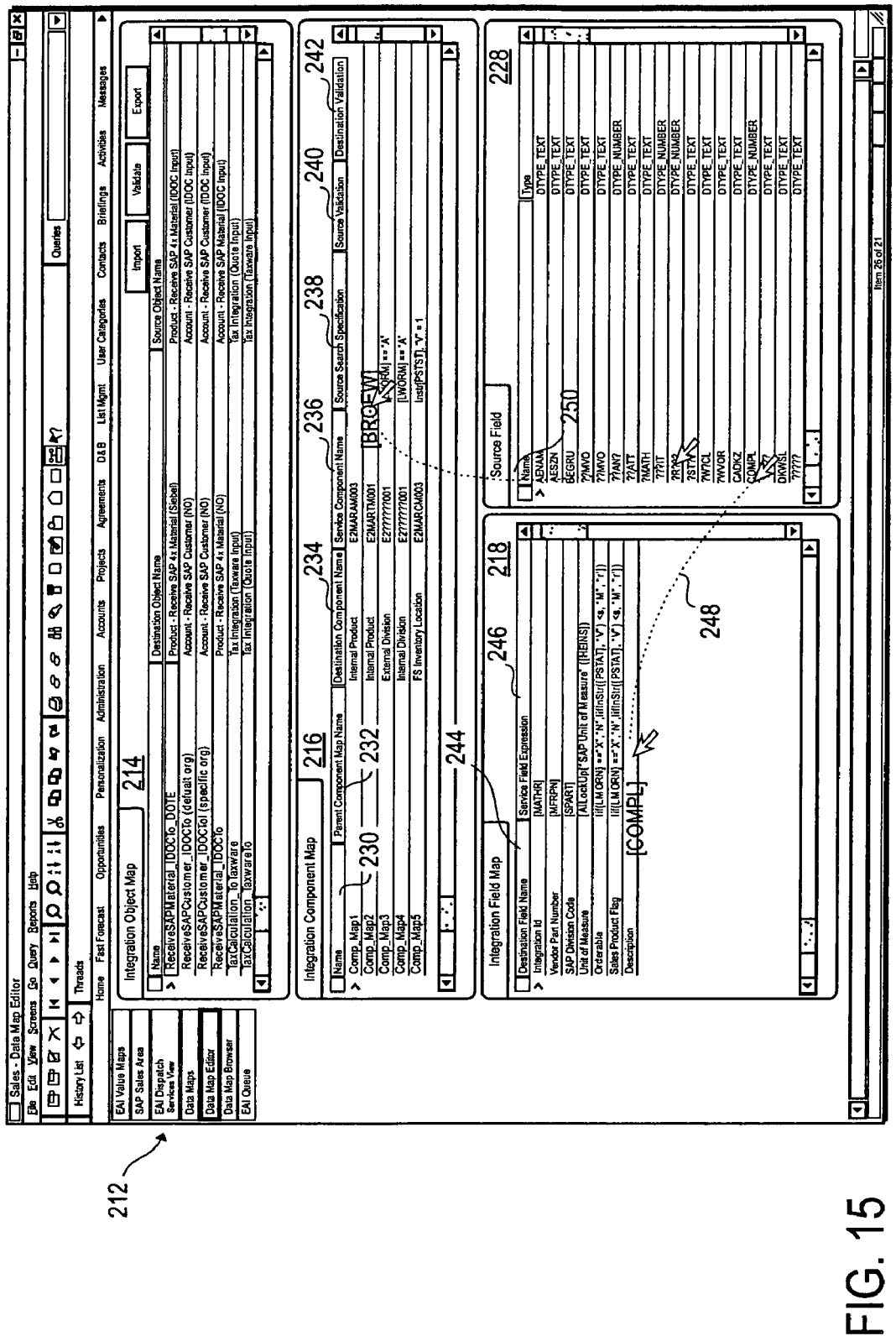
FIG. 15 is a representation of an exemplary second user-interface provided by the application program that enables a user to define further aspects of a transformation map, including a set of component maps and field maps.
Figure 16:
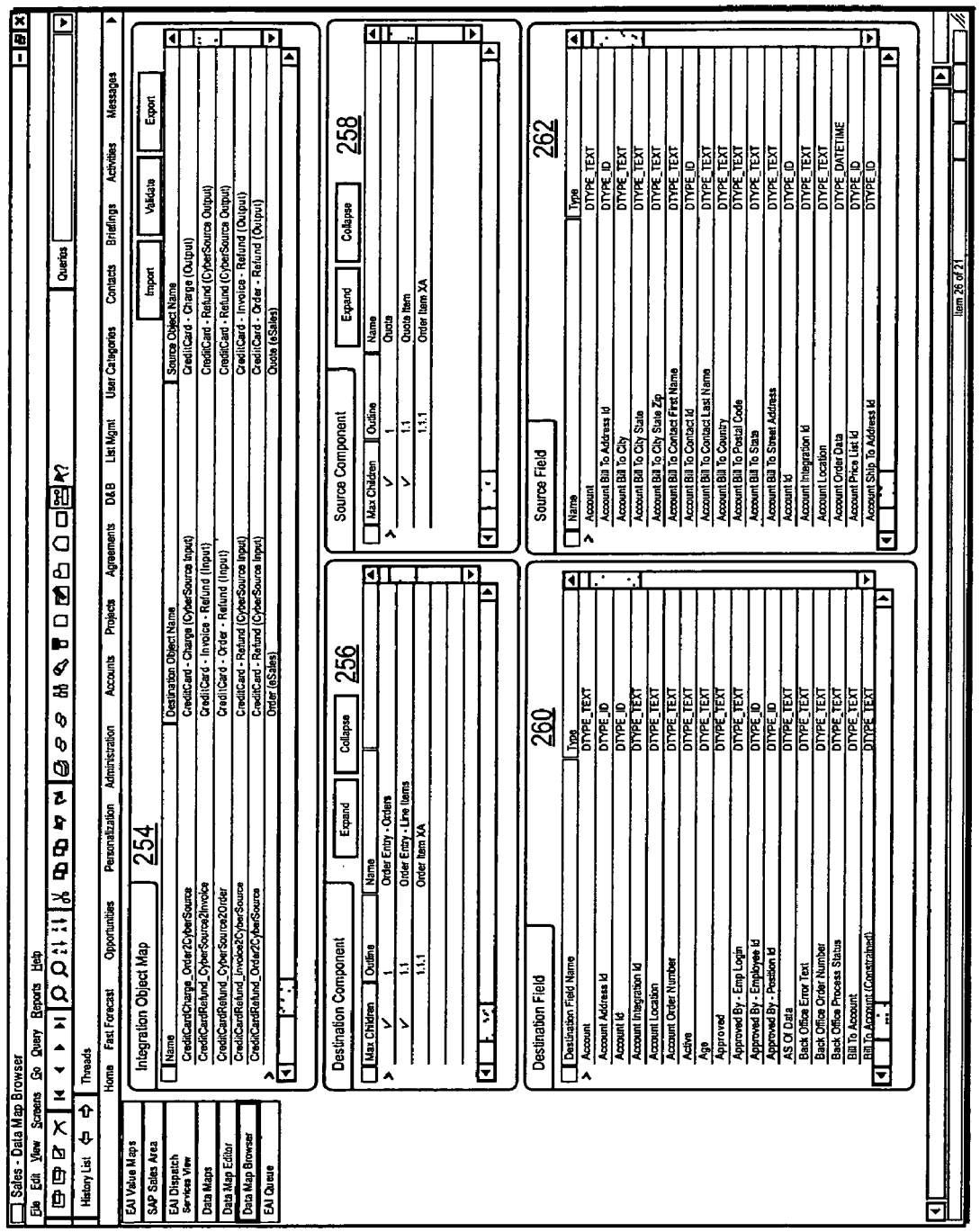
FIG. 16 is a representation of an exemplary third user-interface provided by the application program that enables a user to browser various information pertaining to transformation maps.

The present invention also provides a means for enabling users to easily define transformation mapping functions, object maps, and component maps through an application program that includes a user-interface (UI) that is exemplified in FIGS. 14-16. In a data map UI 200 in FIG. 14, a user is able to define object maps in an Integration Object Map pane 202, and to define corresponding Map arguments in a Map Argument pane 204. As shown in the Figure, Integration Object Map pane 202 enables a user to enter the name of the object map in a Name field 206, the names of the destination and source objects in a Destination Object Name field 208 and a Source Object Name field 210.

In FIG. 15, a data map editor UI 212 is illustrated. This UI comprises an Object Map pane 214, a Component Map pane 216, a Field Map pane 218, and a Source Field pane 228. To edit a data map, a user selects an object map in Object Map pane 214 or creates a new object map definition. The component maps for the object map may then be entered in Component Map pane 216, which includes a Name field 230, a Parent Component Map Name field 232, a Destination Component Name field 234, a Source Component Name field 236, and a Source Search Specification field 238. In addition, preconditions can be defined in a Source Validation field 240, while postconditions can be defined in a Destination Validation field 242.

As discussed above, for each component map, there will be zero or more field maps. These field maps are defined in Field Map pane 218, which includes a Destination Field Name field 244 and a Source Field Expression field 246. A list of source fields (i.e., columns in tables corresponding to the source object) and various information corresponding to the source fields are displayed in Source Field pane 228 for the user's convenience. In addition, Source Field pane 228 enables a user to select a source field name and drag and drop the source field name into source field expressions, source search specifications, precondition expressions, and postcondition expressions, as illustrated by paths 248 and 250.

With reference to FIG. 16, a data map browser UI 252 enables users to browse various data map information. This includes viewing object map definitions in an Object Map pane 254, a hierarchical format of destination components in a Destination Component pane 256, a hierarchical format of a source component in a Source Component pane 258, various destination field information in a Destination Field pane 260, and various source field information in a Source Field pane 262.

Figure 17:
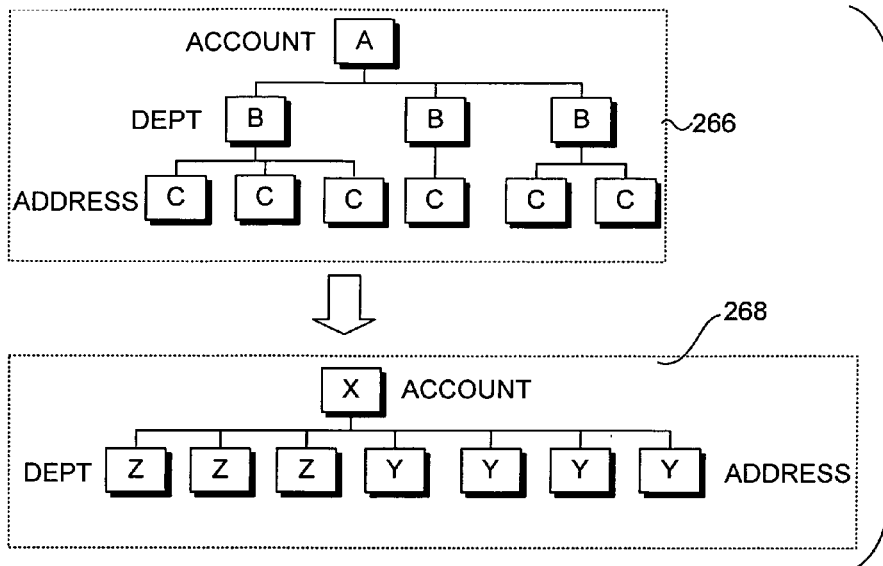
FIG. 17 is a pictorial representation of the structure of a data object in its source and destination forms.

The present invention also provides a means for graphically defining the source and destination structures of objects that are transformed by DDTE 12. For example, suppose an "Account" object comprising an account, departments corresponding to the account, and addresses corresponding to each of the departments are to be converted. A source form 266 and a destination form 268 of an instance of the Account object are shown in FIG. 17. Source form 266 includes a three-level hierarchy of linked component instances "A", "B", and "C", wherein component instance "A" corresponds to an account, component instances "B" are departments corresponding to the account, and component instances "C" are addresses corresponding to each of the departments. In contrast, destination form 268 comprises a two-level hierarchy including linked component instances "X", "Y", and "Z", wherein component instance "X" corresponds to the account, component instances "Z" correspond to the departments, and component instances "Y" correspond to the addresses of those departments. Note that there are only four addresses in the destination form, indicating that some of the six addresses in the source form are duplicates. The elimination of such duplicates is automatically performed by DDTE 12 based on information in the transformation maps and in the destination metadata.

In the foregoing discussion, the form of a particular instance of an object is depicted. In general, each object instance will comprise a set of component instances in a relational hierarchy, wherein the number of component instances will vary. However, the relational definition for the source and destination instances of the objects remains constant, as defined by source metadata 34 and destination metadata 44.

Figure 18:
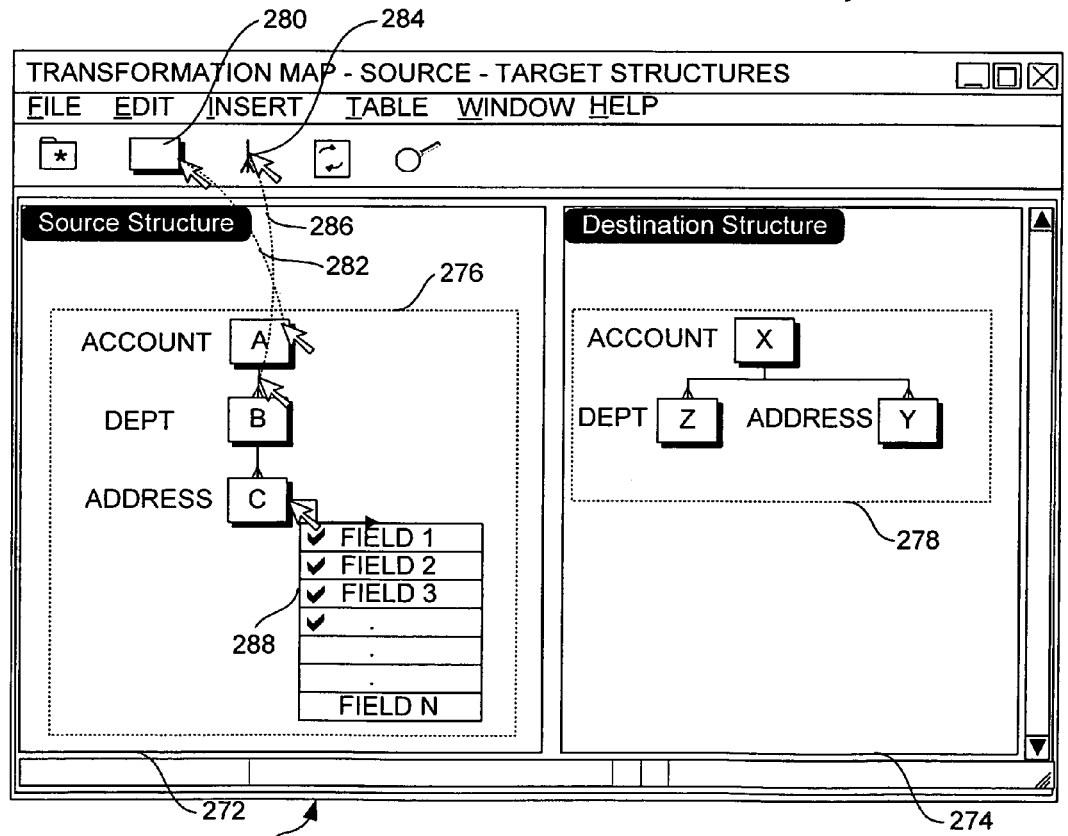
FIG. 18 is a representation of an exemplary fourth user-interface provided by the application program that enables a user to graphically define the structure of a data object to be transformed from its source to destination forms.

As shown in FIG. 18, a UI 270 enables a user to graphically define the structure of source and destination forms of data objects to be transformed in a source structure pane 272 and a destination structure pan 274, as depicted by a source structure diagram 276 and a destination structure diagram 278. The user begins the process by selecting a component icon 280 and dragging and dropping it onto source structure pane 272 at a desired location, as depicted by arc 282. This component icon then becomes the active component. At this point, the user can select to have related components automatically added to the source structure diagram, or the user can manually select to add a related component. The process of automatically adding related components is performed by looking at the source metadata for other components that contain constraints that reference the active component. Typically, these constraints will correspond to a one-to-many relationship that exists between the active component and a child component. When a user adds other components, the relationships between those components may be automatically added. Optionally, the user can add relationships by dragging and dropping a relationship icon 284, as represented by arc 286. In general, a user will want to use the automated features for source structure definitions. The use of automatic or manual diagram of the destination structure will typically depend on whether the destination structure is predefined (e.g., a set of tables in which the data corresponding to the transformed object have already been defined). If the destination structure doesn't exist, the user is enabled to manually create a new set of related components.

In addition to defining component hierarchies, UI 270 also enables users to select which columns are included in the source and destination structures. For example, the user can double-click a component, which will launch a drop-down list 288 of columns of the underlying table the component corresponds to, wherein the user can select columns (i.e., fields) to be included in the component by checking those columns in the drop-down list).

Because of the object-oriented nature of the DDTE and its associated components, including UIs 200, 212, 252, and 270, the various information that is provided on the user-interfaces will correspond to those components defined in the source and destination structure diagrams, enabling transformation maps to be more easily created.

Exemplary Computer System for Use as Client Machines in System

Figure 19:
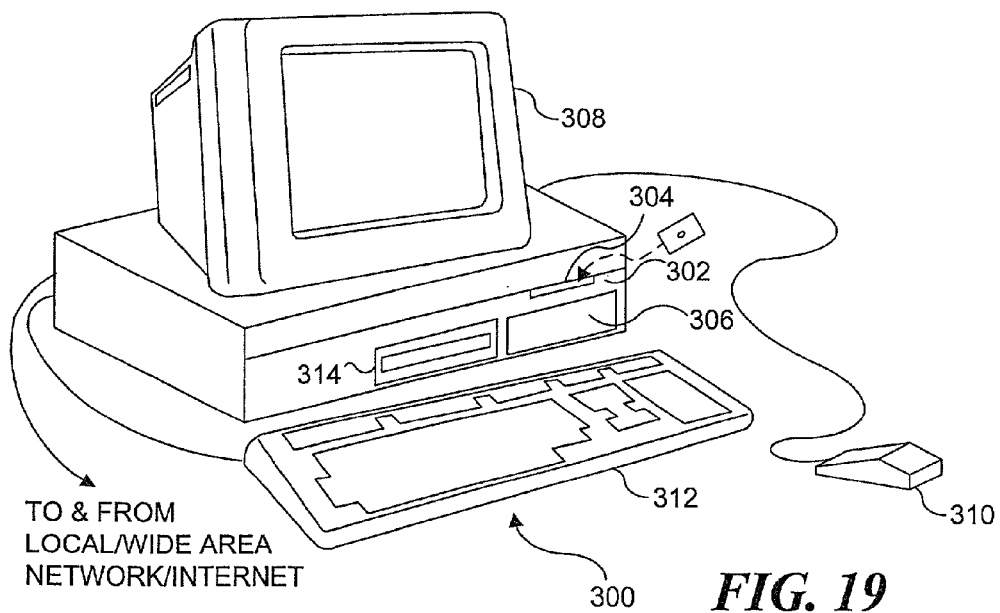
FIG. 19 is a schematic diagram illustrating the primary components of an exemplary computer system suitable for implementing the present invention.

With reference to FIG. 19, a generally conventional computer 300 is illustrated, which is suitable for use in connection with practicing the present invention, and may be used for running a client application comprising one or more software modules that implement the various functions of the invention discussed above. Examples of computers that may be suitable for clients as discussed above include PC-class systems operating the Windows NT or Windows 2000 operating systems, Sun workstations operating the UNIX-based Solaris operating system, and various computer architectures that implement LINUX operating systems. In one embodiment discussed above with respect to the user-interfaces illustrated in FIGS. 14-16 and 18 a Windows-based operating system is used. Computer 300 is also intended to encompass various server architectures as well, on which various databases may be operated, such as source database 10 and destination database 14. Alternatively, other similar types of computers may be used, including computers with multiple processors.

Computer 300 includes a processor chassis 302 in which are mounted a floppy disk drive 304, a hard drive 306, a motherboard populated with appropriate integrated circuits (not shown) including memory and one or more processors, and a power supply (also not shown), as are generally well known to those of ordinary skill in the art. It will be understood that hard drive 306 may comprise a single unit, or multiple hard drives, and may optionally reside outside of computer server 300. A monitor 308 is included for displaying graphics and text generated by software programs and program modules that are run by the computer server. A mouse 310 (or other pointing device) may be connected to a serial port (or to a bus port or USB port) on the rear of processor chassis 302, and signals from mouse 310 are conveyed to the motherboard to control a cursor on the display and to select text, menu options, and graphic components displayed on monitor 308 by software programs and modules executing on the computer. In addition, a keyboard 312 is coupled to the motherboard for user entry of text and commands that affect the running of software programs executing on the computer. Computer 300 also includes a network interface card (not shown) for connecting the computer to a computer network, such as a local area network, wide area network, or the Internet Computer 300 may also optionally include a compact disk-read only memory (CD-ROM) drive 314 into which a CD-ROM disk may be inserted so that executable files and data on the disk can be read for transfer into the memory and/or into storage on hard drive 306 of computer 300. Other mass memory storage devices or other machine-readable storage media such as an optical recorded medium or DVD drive may be included. The machine instructions comprising the software program that causes the CPU to implement the functions of the present invention that have been discussed above will likely be distributed on floppy disks or CD-ROMs (or other memory media) and stored in the hard drive until loaded into random access memory (RAM) for execution by the CPU.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A computer-implemented method comprising:
   creating a source data structure corresponding to a source form, wherein
   a data object is stored in the source form in a source database,
   the source data structure comprises a plurality of source components that are related through a first set of parent-child relationships, and the first set of parent-child relationships form a first source hierarchical structure;
creating a destination data structure corresponding to a destination form, wherein
the destination data structure comprises a plurality of destination components that are related through a second set of parent-child relationships,
the second set of parent-child relationships form a second destination hierarchical structure, and
the creating the destination data structure comprises
extracting metadata from a destination database to define the destination data structure, and
determining, based on the metadata extracted from the destination database, a type of the data object in the destination database;
receiving a transformation map, wherein
the transformation map comprises a set of transformation mapping expressions for transforming the data object between the source form and the destination form,
the set of transformation mapping expressions comprises an object map,
the object map comprises a component map, and
the component map comprises mappings between
at least one component in a first source hierarchical level of the first source hierarchical structure, and
at least one component in a second destination hierarchical level of the second destination hierarchical structure, wherein the second destination hierarchical level differs from the first source hierarchical level;
automatically transforming the data object from the source form into the destination form based on the transformation map, wherein the transforming is performed by one or more processors; and
storing the transformed data object, using a machine-readable storage medium, in the destination form into the destination database.

2. The method of claim 1, wherein the source database is accessed by a source application, and the destination database is accessed by a destination application.

3. The method of claim 1, wherein:
the source components of the data object are stored in the source database as a plurality of data records in related source tables having the first source hierarchical structure; and
the destination components are to be stored in the destination database as a plurality of data records in related destination tables having the second destination hierarchical structure.

4. The method of claim 1, comprising:
receiving the data object, in the source form, from a source schema running in the source database as a plurality of data records in related source tables having the first source hierarchical structure; and
receiving the transformation map from a plurality of database tables, wherein the database tables comprise
a first database table comprising
an identifier of the object map,
an identifier of the data object in the source database, and
an identifier of the data object in the destination database, and
a second database table, distinct from the first database table, comprising
an identifier of the component map,
an identifier of a parent map,
an identifier of the at least one component in the first source hierarchical level of the first source hierarchical structure, and
an identifier of the at least one component in the second destination hierarchical level of the second destination hierarchical structure,
storing the data object, in the destination form, in a destination schema running in the destination database as a plurality of data records in related destination tables having the second destination hierarchical structure.

5. The method of claim 1, comprising enabling a user to define a precondition to check whether a source component contains data that meets a predetermined criteria.

6. The method of claim 1, comprising enabling a user to define a postcondition to check whether a destination component contains data that meets a predetermined criteria.

7. The method of claim 1, comprising creating an in-memory representation of the source data structure form for the data object being transformed, wherein the in memory representation comprises an in-memory hierarchical structure comprises one or more instances of the plurality of source components and one or more parent-child relationships defined between those instances of the source components.

8. The method of claim 7, comprising traversing the in-memory hierarchical structure while applying transformation mapping expressions to appropriate source component instances occupying a level of the in-memory hierarchical structure as the in-memory hierarchical structure is traversed.

9. The method of claim 1, comprising creating an in-memory representation of the destination data structure form for the data object being transformed, wherein the in-memory representation comprises an in-memory hierarchical structure comprising one or more instances of the plurality of destination components and one or more parent-child relationships defined between those instances of the destination components.

10. The method of claim 1, wherein:
the source data structure comprises relationships among the plurality of source components and attributes for components among the plurality of source components;
the destination data structure comprises relationships among the plurality of destination components and attributes for components among the plurality of destination components;
the component map comprises a field map that relates the attributes for the components among the plurality of source components to the attributes for the components among the plurality of destination components: and
the method comprises receiving the transformation map from a plurality of database tables, wherein the database tables comprise
a first database table comprising
an identifier of the object map,
an identifier of the data object in the source database, and
an identifier of the data object in the destination database,
a second database table, distinct from the first database table, comprising
an identifier of the component map,
an identifier of a parent map,
an identifier of the component in the first source hierarchical level of the first source hierarchical structure, and
an identifier of the component in the second destination hierarchical level of the second destination hierarchical structure, and a third database table comprising
an identifier of the field map,
a plurality of expressions, comprising, for each attribute for the component in the second destination hierarchical level of the second destination hierarchical structure
a corresponding expression defining the attribute based upon one or more attributes of the component in the first source hierarchical level of the first source hierarchical structure.

11. The method of claim 1, wherein the creating the source data structure comprises extracting metadata from the source database to define the source data structure.

12. The method of claim 11, comprising providing a user-interface, wherein the user-interface enables a user to:
define the source data structure by selecting source components corresponding to the data object from the metadata extracted from the source database, and
define the destination data structure by selecting destination components corresponding to the destination form from the metadata extracted from the destination database.

13. The method of claim 12, wherein the user-interface enables the user to graphically define the source data structure and the destination data structure.

14. The method of claim 11, comprising providing a user-interface, wherein the user-interface enables a user to:
define the source data structure by selecting source components corresponding to the data object from the metadata corresponding to the source schema; and
define the destination data structure by selecting destination components corresponding to the destination form from the metadata corresponding to the destination schema.

15. The method of claim 14, wherein the user-interface enables the user to graphically define the source data structure and the destination data structure.

16. The method of claim 1, wherein the transforming comprises:
sorting a plurality of components for the destination data structure according to criteria specified in the transformation map.

17. The method of claim 1, comprising:
eliminating, based on the metadata extracted from the destination database, a data object that was duplicatively stored in the source database from being duplicatively stored in the destination database.

18. A computer system comprising:
a first circuit configured to extract data corresponding to a data object from a source database;
a second circuit configured to enable a user to
define a source data structure for the data object,
define a destination data structure for the data object, based on metadata extracted from a destination database,
determine, based on the metadata extracted from the destination database, a type of the data object in the destination database, and
define a transformation map, wherein
the transformation map comprises a plurality of declarative expressions for mapping the data object from a source form into a destination form,
the data object is stored in the source form in the source database,
the data object is stored in the destination form in the destination database,
the source database comprises a plurality of source components that are related through a first set of parent-child relationships forming a first source hierarchical structure,
the destination database comprises a plurality of destination components that are related through a second set of parent-child relationships forming a second destination hierarchical structure,
the transformation map comprises an object map,
the object map comprises a component map, and
the component map comprises mappings between
at least one component in a first source hierarchical level of the first source hierarchical structure, and
at least one component in a second destination hierarchical level of the second destination hierarchical structure, wherein the second destination hierarchical level differs from the first source hierarchical level;
a third circuit configured to transform the data object from the source form into the destination form based on the declarative expressions in the transformation map; and
a fourth circuit configured to store the data object in the destination form in the destination database.

19. The system of claim 18, wherein:
the data object is stored, in the source form, in a source schema running in the source database as a plurality of data records in related source tables having the first source hierarchical structure; and
the data object is stored, in the destination form, in a destination schema running in the destination database as a plurality of data records in related destination tables having the second destination hierarchical structure.

20. The system of claim 18, wherein:
the source data structure comprises relationships among the plurality of source components and attributes for components among the plurality of source components;
the destination data structure comprises relationships among the plurality of destination components and attributes for components among the plurality of destination components; and
the component map comprises a field map that relates the attributes for the components among the plurality of source components to the attributes for the components among the plurality of destination components.

21. The system of claim 18, wherein the second circuit is configured to enable the user to define the source data structure for the data object based on metadata extracted from the source database.

22. The system of claim 18, wherein the third circuit is configured to:
sort a plurality of components for the destination data structure according to criteria specified in the transformation map.

23. The system of claim 18, wherein the second circuit is configured to:
eliminate, based on the metadata extracted from the destination database, a data object that was duplicatively stored in the source database from being duplicatively stored in the destination database.

24. A machine-readable storage medium, having encoded therein, instructions which, when executed by a processing system, cause the processing system to perform a method comprising:
creating a source data structure corresponding to a source form, wherein a data object is stored in the source form in a source database, the source data structure comprises a plurality of source components that are related through a first set of parent-child relationships, and the first set of parent-child relationships form a first source hierarchical structure;

creating a destination data structure corresponding to a destination form, wherein the destination data structure comprises a plurality of destination components that are related through a second set of parent-child relationships, the second set of parent-child relationships form a second destination hierarchical structure, and the creating the destination data structure comprises extracting metadata from a destination database to define the destination data structure, and determining, based on the metadata extracted from the destination database, a type of the data object in the destination database;

enabling a user to define a transformation map, wherein the transformation map comprises a set of transformation mapping expressions for transforming the data object between the source form and the destination form, the set of transformation mapping expressions comprises an object map, the object map comprises a component map, and the component map comprises mappings between at least one component in a first source hierarchical level of the first source hierarchical structure, and at least one component in a second destination hierarchical level of the second destination hierarchical structure, wherein the second destination hierarchical level differs from the first source hierarchical level; and automatically transforming the data object from the source form into the destination form based on the transformation map.

25. The machine-readable medium of claim 24, wherein the source database is accessed by a source application, and the destination database is accessed by a destination application.

26. The machine-readable medium of claim 24, wherein the method comprises enabling the user to define a precondition to check whether a source component contains data that meets a predetermined criteria.

27. The machine-readable medium of claim 24, wherein the method comprises enabling the user to define a postcondition to check whether a destination component contains data that meets a predetermined criteria.

28. The machine-readable medium of claim 24, wherein the method comprises creating an in-memory representation of the source data structure form comprising an in-memory hierarchical structure comprising one or more instances of the plurality of source components and one or more parent-child relationships defined between those instances of the source components.

29. The machine-readable medium of claim 28, wherein the method comprises traversing the in-memory hierarchical structure while applying transformation mapping expressions to appropriate source component instances occupying a level of the in-memory hierarchical structure as the structure is traversed.

30. The machine-readable medium of claim 24, wherein the method comprises creating an in-memory representation of the destination data structure form for the data object comprising a hierarchical structure including one or more instances of the plurality of destination components and one or more parent-child relationships defined between those instances of the destination components.

31. The machine-readable medium of claim 24, wherein:

the source data structure comprises relationships among the plurality of source components and attributes for components among the plurality of source components;

the destination data structure comprises relationships among the plurality of destination components and attributes for components among the plurality of destination components; and the component map comprises a field map that relates the attributes for the components among the plurality of source components to the attributes for the components among the plurality of destination components.

32. The machine-readable medium of claim 24, wherein the creating the source data structure comprises extracting metadata from the source database to define the source data structure.

33. The machine-readable medium of claim 32, wherein the method comprises providing a user-interface that enables the user to:

define the source data structure by selecting source components from the metadata extracted from the source database; and define the destination data structure by selecting destination components from the metadata extracted from the destination database.

34. The machine-readable medium of claim 33, wherein the user-interface enables the user to graphically define the source data structure and the destination data structure.

35. The machine-readable medium of claim 32, wherein:

the data object is stored, in the source form, in a source schema running in the source database as a plurality of data records in related source tables having the first source hierarchical structure; and the data object is stored, in the destination form, in a destination schema running in the destination database as a plurality of data records in related destination tables having the second destination hierarchical structure.

36. The machine-readable medium of claim 35, wherein the method comprises providing a user-interface, wherein the user-interface enables the user to:

define the source data structure by selecting source components corresponding to the data object from the metadata corresponding to the source schema; and define the destination data structure by selecting destination components corresponding to the destination data structure form from the metadata corresponding to the destination schema.

37. The machine-readable medium of claim 24, wherein the transforming comprises:

sorting a plurality of components for the destination data structure according to criteria specified in the transformation map.

38. The machine-readable medium of claim 24, wherein the method comprises:

eliminating, based on the metadata extracted from the destination database, a data object that was duplicatively stored in the source database from being duplicatively stored in the destination database.

* * * * *

UNITED STATES PATENT AND TRADEMARK OFFICE
CERTIFICATE OF CORRECTION

| | |
|---|---|
| PATENT NO. | : 7,853,553 B2 |
| APPLICATION NO. | : 10/118667 |
| DATED | : December 14, 2010 |
| INVENTOR(S) | : Risto Lankinen et al. |

It is certified that error appears in the above-identified patent and that said Letters Patent is hereby corrected as shown below:

In column 1, line 7, delete "TRANFORMATION" and insert -- TRANSFORMATION --, therefor.

In column 1, line 7, after "ENGINE" insert -- . --.

In column 5, line 22, delete ""A"" and insert -- "A" --, therefor.

In column 6, line 52, delete ""OBJ_MAP _JD,"" and insert -- "OBJ_MAP_ID," --, therefor.

In column 18, line 19, in claim 7, delete "in memory" and insert -- in-memory --, therefor.

Signed and Sealed this
Ninth Day of August, 2011

David J. Kappos
*Director of the United States Patent and Trademark Office*